(12) United States Patent
Fukagawa et al.

(10) Patent No.: US 8,922,889 B2
(45) Date of Patent: Dec. 30, 2014

(54) CELLULOSE ACYLATE FILM, PROTECTIVE FILM FOR POLARIZING PLATE, POLARIZING PLATE, AND LIQUID CRYSTAL DISPLAY DEVICE

(71) Applicant: Fujifilm Corporation, Tokyo (JP)

(72) Inventors: Nobutaka Fukagawa, Kanagawa (JP); Masaki Noro, Kanagawa (JP); Shuuji Kanayama, Kanagawa (JP); Hiroshi Inada, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 277 days.

(21) Appl. No.: 13/675,615

(22) Filed: Nov. 13, 2012

(65) Prior Publication Data

US 2013/0120839 A1    May 16, 2013

(30) Foreign Application Priority Data

Nov. 14, 2011 (JP) ................. 2011-248841

(51) Int. Cl.
*G02B 5/30* (2006.01)
*C09K 19/02* (2006.01)
*B32B 23/04* (2006.01)
*C08L 1/10* (2006.01)

(52) U.S. Cl.
CPC ............. *C09K 19/02* (2013.01); *B32B 23/04* (2013.01); *C08L 1/10* (2013.01); *G02B 5/30* (2013.01); *G02B 5/3025* (2013.01)
USPC ............. 359/483.01; 359/487.02; 349/96; 349/122

(58) Field of Classification Search
USPC ............ 359/483.01, 487.01, 487.02, 122; 349/96

See application file for complete search history.

(56) References Cited

U.S. PATENT DOCUMENTS

| 7,083,752 | B2* | 8/2006 | Bermel ............ 264/171.1 |
| 7,379,131 | B2* | 5/2008 | Ito et al. ............ 349/96 |
| 7,410,679 | B2* | 8/2008 | Matsufuji ............ 428/1.3 |
| 7,504,139 | B2* | 3/2009 | Kawanishi et al. ...... 428/1.54 |
| 2006/0069192 | A1 | 3/2006 | Nakamura et al. |
| 2008/0213512 | A1 | 9/2008 | Nakamura et al. |
| 2009/0142515 | A1 | 6/2009 | Nakamura et al. |

FOREIGN PATENT DOCUMENTS

| JP | 2005-206721 A | 8/2005 |
| JP | 2006-123513 A | 5/2006 |
| JP | 2009-167416 A | 7/2009 |
| WO | 2007/072643 A1 | 6/2007 |

* cited by examiner

*Primary Examiner* — Ricky D Shafer
(74) *Attorney, Agent, or Firm* — Jean C. Edwards, Esq.; Edwards Neils PLLC

(57) ABSTRACT

There is provided a cellulose acylate film, containing a hindered amin-based compound, wherein the hindered amine-based compound is contained in an amount of 0.001% by mass to 5% by mass based on cellulose acylate, a minimum value of Knoop hardness is 170 N/mm$^2$ to 220 N/mm$^2$, and the Knoop hardness is measured several times by a Knoop indenter, the Knoop indenter is rotated by a given angle in each measurement, and a rotation axis of the Knoop indenter is orthogonal to an upper surface of the cellulose acylate film.

12 Claims, 1 Drawing Sheet

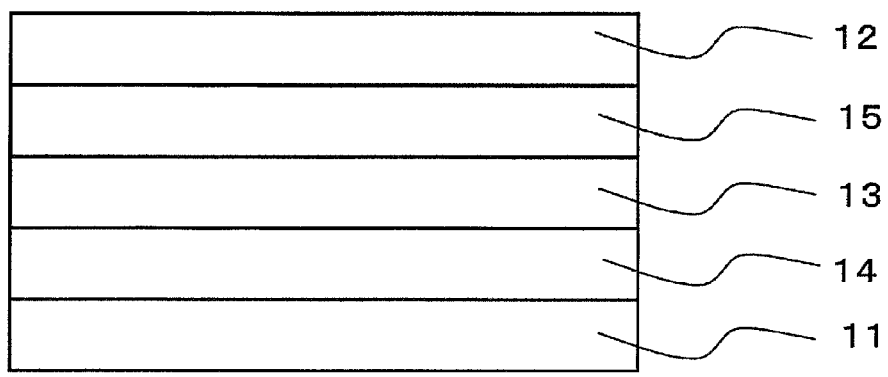

CELLULOSE ACYLATE FILM, PROTECTIVE FILM FOR POLARIZING PLATE, POLARIZING PLATE, AND LIQUID CRYSTAL DISPLAY DEVICE

CROSS-REFERENCE TO RELATED APPLICATION(S)

The present application claims priority from Japanese Patent Application No. 2011-248841 filed on Nov. 14, 2011, the entire content of which is incorporated herein by reference.

BACKGROUND

1. Field

The present invention relates to a cellulose acylate film, a protective film for polarizing plate, a polarizing plate using the protective film for polarizing plate, and a liquid crystal display device.

2. Description of the Related Art

Recently, liquid crystal display (LCD) devices, especially those for use in TVs are becoming larger, and hence high definition and low price are demanded for LCD devices more and more. In addition, since LCD devices are expected to be used more frequently for outdoor applications, mainly as electronic sign boards in the future, there is a demand for LCD devices which can withstand more severe environments than in the past.

Meanwhile, it is required to impart some functions such as scratch resistance, anti-reflection and antistatic property to the surface of a viewer side polarizing plate used in LCDs. An ordinary method for enhancing scratch resistance is to provide a layer with high hardness on a protective film of the polarizing plate, such as a layer hardened by irradiating an active energy ray (hereinafter referred to as "an active energy ray-cured layer"). Further, it is known that enhancing the surface hardness of the protective film for polarizing plate itself is also effective. Japanese Patent Application Laid-Open No. 2005-206721 discloses a method for using a cellulose acylate film having a high surface hardness as a protective film for polarizing plate.

A polarizing plate widely used in LCD devices is configured such that a polarizer using polyvinyl alcohol (PVA) and iodine is sandwiched between protective films for polarizing plates such as cellulose acylate film. However, the polarizer using PVA and iodine has a drawback in that the polarizer performance is prone to deteriorate under high temperature and high humid environments, and thus, is needed to be improved in order to satisfy the performance required for outdoor applications.

Outdoor applications require more rigorous durability for an active energy ray-cured layer as compared with indoor applications. Among them, stability against light is an especially important criterion. However, active energy ray-cured layers in the related art have a problem in that they are easily peeled from a cellulose acylate film when irradiated with light for a long period of time, and thus, are needed to be improved.

Generally, a means for enhancing light resistance is to add an ultraviolet ray absorbent or an antioxidant. For example, Japanese Patent Application Laid-Open No. 2009-167416 discloses a resin film to which a triazine-based ultraviolet ray absorbent and a hindered amine-based antioxidant are added. Further, International Publication WO 2007/072643 and Japanese Patent Application Laid-Open No. 2006-123513 disclose a cellulose acylate film containing a hindered amine-based antioxidant.

However, the present inventors have reviewed and found out that the film obtained by the method as described in Patent Japanese Patent Application Laid-Open No. 2005-206721 has insufficient adhesion between a hardcoat layer and a cellulose acylate film when irradiated with light for a long period of time. Meanwhile, the methods of Japanese Patent Application Laid-Open No. 2009-167416, International Publication WO 2007/072643, and Japanese Patent Application Laid-Open No. 2006-123513 may exhibit a certain improving effect on adhesion between a hardcoat layer and a cellulose acylate film when irradiated with light for a long period of time. However, it was found out that there is a problem in that scratch resistance is impaired when a hindered amine-based antioxidant is added in a large amount.

The present invention has been made in consideration of the above situation, and an object of the present invention is to provide a cellulose acylate film which is excellent in scratch resistance, and sufficiently maintains the adhesion with an active energy ray-cured layer such as a hardcoat layer when irradiated with light for a long period of time. Further, another object of the present invention is to provide a polarizing plate and a liquid crystal display device using the protective film for polarizing plate.

Conventionally, an affinity between the surface of the hardcoat layer and the cellulose acylate film and/or a degree of crosslinking in the hardcoat layer has been considered as important factors for adhesion between a hardcoat layer and a cellulose acylate film. However, the present inventors have studied intensively studied, and as a result, found out that peeling between the hardcoat layer and the cellulose acylate film may be sometimes caused by the brittle fracture of the surface layer of the cellulose acylate film. Furthermore, the present inventors have found out that a radical generated by photoreaction of additives in the hardcoat layer or the cellulose acylate film causes depolymerization of the resin (cellulose acylate) contained in the cellulose acylate film and the depolymerization is one large factor for the brittle fracture. The present inventors also have found out that, when an antioxidant (a hindered amine-based compound) is added to the cellulose acylate film in a specific amount, the adhesion between the active energy ray-cured layer such as a hardcoat layer and the cellulose acylate film is improved.

Furthermore, the present inventors have found out that the reduction in free volume of the cellulose acylate film enhances the surface hardness, as well as more effectively improves the adhesion between the active energy ray-cured layer such as a hardcoat layer and the cellulose acylate film by the hindered amine-based compound. It is supposed that this is caused because the hindered amine-based compound is suppressed from being diffused into the active energy ray-cured layer as the free volume of the cellulose acylate film is reduced.

SUMMARY

That is, the present invention is configured as follows.
(1) A cellulose acylate film, having a hindered amin-based compound, wherein the hindered amine-based compound is contained in an amount of 0.001% by mass to 5% by mass based on cellulose acylate, a minimum value of Knoop hardness is 170 N/mm$^2$ to 220 N/mm$^2$, and the Knoop hardness is measured several times by a Knoop indenter under press load of 50 mN in accordance with a method of JIS Z 2215, the Knoop indenter is rotated by a given angle in each measurement, the each measurement is carried out at the same press position and a rotation axis of the Knoop indenter is orthogonal to an upper surface of the cellulose acylate film.

(2) The cellulose acylate film according to (1), further having a compound represented by the following Formula (1) in an amount of 2% by mass to 20% by mass based on cellulose acylate:

B-(G-A)n-G-B                                                    Formula (1)

wherein, each of B independently represents a benzenemonocarboxylic acid residue, each of G independently represents an alkylene glycol residue having 2 to 12 carbon atoms, an aryl glycol residue having 6 to 12 carbon atoms or an oxyalkylene glycol residue having 4 to 12 carbon atoms, A represents an alkylenedicarboxylic acid residue having 4 to 12 carbon atoms or an arylenedicarboxylic acid residue having 6 to 12 carbon atoms, and n represents an integer of 1 or more.

(3) The cellulose acylate film according to (2), having two or more kinds of the compound represented by Formula (1).

(4) The cellulose acylate film according to (1), further having a compound represented by the following Formula (I) in an amount of 2% by mass to 20% by mass based on cellulose acylate:

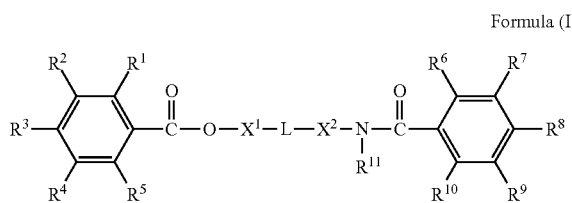

Formula (I)

wherein, each of $R^1$ to $R^7$ and $R^9$ to $R^{11}$ independently represents a hydrogen atom or a substituent, $R^8$ represents a hydrogen atom or a non-conjugated substituent, each of $X^1$ and $X^2$ represents a single bond or an aliphatic linking group, L represents a single bond, $-N(R^{12})-$ or $-C(R^{13})(R^{14})-$, and each of $R^{12}$ to $R^{14}$ independently represents a hydrogen atom or a substituent.

(5) The cellulose acylate film according to (1), wherein the hindered amine-based compound is contained in an amount of 0.05% by mass to 2% by mass based on cellulose acylate.

(6) The cellulose acylate film according to (1), wherein the hindered amine-based compound is represented by the following Formula (20):

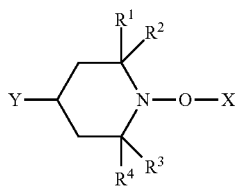

Formula (20)

wherein, X represents an alkyl group or an aryl group which may be substituted, Y represents a hydrogen atom or a substituent, and each of $R^1$ to $R^4$ independently represents an alkyl group.

(7) The cellulose acylate film according to (1), wherein a difference ($\Delta Hm-\Delta Hc$) between a cold crystallization peak area ($\Delta Hc$) and a crystal melting peak area ($\Delta Hm$) is 10 J/g to 18 J/g when measured by differential scanning calorimetry (DSC).

(8) The cellulose acylate film according to (1), wherein a degree of alignment in the thickness direction of the cellulose acylate film is 0.100 to 0.150.

(9) A protective film for polarizing plate, having: the cellulose acylate film according to (1); and an active energy ray-cured layer on the cellulose acylate film.

(10) A polarizing plate, having: a polarizer; and at least one protective film for polarizing plate, wherein the at least one protective film for polarizing plate is the protective film for polarizing plate according to (9), and the protective film for polarizing plate and the polarizer are bonded to each other such that the cellulose acylate film is nearer to the polarizer than the active energy ray-cured layer.

(11) A liquid crystal display device having at least the protective film for polarizing plate according to (9).

(12) A liquid crystal display device having at least the polarizing plate according to (10).

According to the present invention, if an active energy ray-cured layer such as a hardcoat layer is formed, it is possible to obtain a cellulose acylate film which is excellent in scratch resistance, and sufficiently maintains the adhesion with the active energy ray-cured layer even when irradiated with light for a long period of time.

Further, as a protective film for polarizing plate having an active energy ray-cured layer such as a hardcoat layer laminated on the cellulose acylate film, it is possible to obtain a protective film for polarizing plate which is excellent in scratch resistance, and sufficiently maintains the adhesion between the active energy ray-cured layer and the cellulose acylate film even when irradiated with light for a long period of time. Furthermore, according to the present invention, it is possible to provide a polarizing plate having high scratch resistance and light resistance, using the film. In addition, it is possible to provide a liquid crystal display device having improved scratch resistance and light resistance by incorporating the polarizing plate into the liquid crystal display device.

BRIEF DESCRIPTION OF THE DRAWING

FIG. 1 is a schematic cross-sectional view illustrating an example of the liquid crystal display device of the present invention.

DETAILED DESCRIPTION

Hereinafter, the cellulose acylate film, protective film for polarizing plate and the liquid crystal display device of the present invention will be described in detail.

The description for the constitutional requirements of the present invention as described below may be made based on some representative exemplary embodiments of the present invention, but, the present invention is not limited to those exemplary embodiments. Meanwhile, in the present specification, a numerical range represented by using "to" denotes a range including numerical values described before and after "to" as a lower limit and an upper limit.

[Cellulose Acylate Film and Polarizing Protective Film]

The cellulose acylate film of the present invention has a hindered amin-based compound, wherein the hindered amine-based compound is contained in an amount of 0.001% by mass to 5% by mass based on cellulose acylate, a minimum value of Knoop hardness is 170 N/mm² to 220 N/mm², and the Knoop hardness is measured several times by a Knoop indenter under press load of 50 mN in accordance with a method of JIS Z 2215, the Knoop indenter is rotated by a given angle in each measurement, the each measurement is carried out at the same press position and a rotation axis of the Knoop indenter is orthogonal to an upper surface of the cellulose acylate film.

By containing a specific amount of a hindered amine-based compound in the cellulose acylate film having a high surface hardness, that is, a small free volume as described above, it is possible to further enhance a light-induced deterioration preventing effect (an effect of enhancing the adhesion with the active energy ray-cured layer) by the hindered amine-based compound.

Further, the protective film for polarizing plate of the present invention is a protective film for polarizing plate that has an active energy ray-cured layer on a cellulose acylate film, in which the protective film for polarizing plate has a hindered amin-based compound, wherein the hindered amine-based compound is contained in an amount of 0.001% by mass to 5% by mass based on cellulose acylate, a minimum value of Knoop hardness is 170 N/mm$^2$ to 220 N/mm$^2$, and the Knoop hardness is measured several times by a Knoop indenter under press load of 50 mN in accordance with a method of JIS Z 2215, the Knoop indenter is rotated by a given angle in each measurement, the each measurement is carried out at the same press position and a rotation axis of the Knoop indenter is orthogonal to an upper surface of the cellulose acylate film.

First, description will be made with respect to the cellulose acylate film of the present invention and the cellulose acylate film included in the protective film for polarizing plate of the present invention.

1. Cellulose Acylate Film

The cellulose acylate film used in the present invention contains cellulose acylate, and a hindered amine-based compound in an amount of 0.001% by mass to 5% by mass based on the cellulose acylate.

<1-1: Cellulose Acylate>

Examples of the cellulose used as a raw material of the cellulose acylate used in the cellulose acylate film include cotton linter, wood pulp (broad leaf pulp and needle leaf pulp) and the like. The cellulose acylate may be available from any raw cellulose and, if necessary, may be used in a mixture thereof. Detailed description on these raw celluloses can be found in, for example, "Lecture on Plastic Materials (17) Cellulose Resins" (Maruzawa and Uda, The NIKKAN KOGYO SHIMBUN, Ltd., published in 1970) or Japan Institute of Invention and Innovation, Kokai Giho (Open Technical Report) 2001-1745 (pp. 7 to 8), and the cellulose acylate film of the present invention is not limited thereto.

Acyl groups of the cellulose acylate used in the cellulose acylate film may be used either alone or in a mixture of two or more kinds thereof. The cellulose acylate used in the cellulose acylate film preferably has an acyl group having 2 to 4 carbon atoms as a substituent. Examples of the acyl group having 2 to 4 carbon atoms include an acetyl group, a propionyl group and a butanoyl group, and preferably an acetyl group. When two or more kinds of acyl groups are used, one is preferably an acetyl group. With this cellulose acylate, it is possible to prepare a solution having a desirable solubility, and especially, to prepare a solution suitable for non-chlorine-based organic solvents. In addition, it is also possible to prepare a solution having a low viscosity and good filterability.

The cellulose acylate preferably used in the present invention will be described in detail. A β-1,4 linked glucose unit constituting cellulose has free hydroxyl groups at 2-, 3- and 6-positions. Cellulose acylate is a polymer in which all or some of these hydroxyl groups are acylated by acyl groups. The degree of acyl substitution refers to a sum of ratios of acylation of hydroxyl groups at 2-, 3- and 6-positions of cellulose (100% acylation means the degree of substitution of 1 at each location).

The total degree of substitution of the cellulose acylate is preferably 2.0 to 2.97, more preferably from 2.5 to less than 2.97, and particularly preferably 2.70 to 2.95.

The acyl group having two or more carbon atoms of the cellulose acylate may be either an aliphatic acyl group or an aromatic acyl group without any specific limitation. Examples of the cellulose acylate which is substituted with the acyl group include an alkylcarbonyl ester, an alkenylcarbonyl ester, an aromatic carbonyl ester, an aromatic carbonyl ester or an aromatic alkylcarbonyl ester of cellulose, each of which may be further substituted. Preferred examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a teretbutanoyl group, a cyclohexanecarbonyl group, an oleoyl group, a benzoyl group, a naphthylcarbonyl group, a cinnamoyl group and the like, particularly preferably an acetyl group, a propionyl group and a butanoyl group (in the case where the acyl group has 2 to 4 carbon atoms), and more particularly preferably an acetyl group (in the case where the cellulose acylate is cellulose acetate).

When an acid anhydride or an acid chloride is used as an acylating agent in acylation of cellulose, an organic acid such as, for example, acetic acid and methylene chloride is used as an organic solvent which is a reaction solvent.

When the acyating agent is an acid anhydride, a protic catalyst is preferably used as a catalyst. When the acylating agent is an acid chloride (for example, $CH_3CH_2COCl$), a basic compound is used.

The most common industrial method for synthesizing a mixed fatty acid ester of cellulose is a method of acylating cellulose with a fatty acid (acetic acid, propionic acid, valeric acid and the like) corresponding to an acetyl group or any other acyl group, or a mixed organic acid compound containing an acid anhydride thereof.

The cellulose acylate may be synthesized, for example, by a method as described in Japanese Patent Application Laid-Open No. H10-45804.

The cellulose acylate film contains preferably 5% by mass to 99% by mass of cellulose acylate as a resin from the viewpoint of moisture permeability, more preferably 20% by mass to 99% by mass, and particularly preferably 50% by mass to 95% by mass.

<1-2: Hindered Amine-Based Compound>

The hidered amine-based compound (hereinafter, referred to as "HALS") functions as an antioxidant, and has a structure having a bulky organic group (for example, a bulky branched alkyl group) in the vicinity of an N atom. This is a known compound, and includes 2,2,6,6-tetraalkypiperidine compound or an acid addition salt thereof, or a complex thereof with a metal compound, as described in Columns 5 to 11 of U.S. Pat. No. 4,619,956 and Columns 3 to 5 of U.S. Pat. No. 4,839,405. Such a compound includes one represented by the following Formula (2).

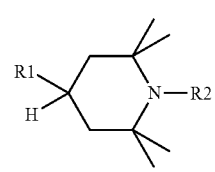

Formula (2)

In the formula, each of R1 and R2 independently represent a hydrogen atom or a substituent.

The substituent represented by R1 is not particularly limited, but preferably a substituent which is linked to the piperidine ring via a nitrogen atom or an oxygen atom, more preferably an amino group, a hydroxyl group, an alkoxy group, an aryloxy group or an acyloxy group which may be substituted, and more preferably an amino group, a hydroxyl group, an alkoxy group or acyloxy group which is substituted with an alkyl group, an aryl group or a heterocyclic group.

The substituent represented by R2 is not particularly limited, but preferably an alkyl group (having preferably 1 to 20 carbon atoms, more preferably 1 to 12 carbon atoms, and particularly preferably 1 to 8, such as a methyl group, an ethyl group, an isopropyl group, a tert-butyl group, an n-octyl group, an n-decyl group, an n-hexadecyl group, a cyclopropyl group, a cyclopentyl group and a cyclohexyl group), an alkenyl group (having preferably 2 to 20 carbon atoms, more preferably 2 to 12 carbon atoms, and particularly preferably 2 to 8 carbon atoms, such as a vinyl group, an allyl group, a 2-butenenyl group and a 3-pentenyl group), an alkynyl group (having preferably 2 to 20 carbon atoms, more preferably 2 to 12 carbon atoms, and particularly preferably 2 to 8 carbon atoms, such as a propargyl group and a 3-pentynyl group), an aryl group (having preferably 6 to 30 carbon atoms, more preferably 6 to 20 carbon atoms, and particularly preferably 6 to 12, such as a phenyl group, a biphenyl group and a naphthyl group), an amino group (having preferably 0 to 20 carbon atoms, more preferably 0 to 10 carbon atoms, and particularly 0 to 6 carbon atoms, such as an amino group, a methylamino group, a dimethylamino group, a diethylamino group and a dibenzylamino group), an alkoxy group (having preferably 1 to 20 carbon atoms, more preferably 1 to 12 carbon atoms, and particularly preferably 1 to 8, such as a methoxy group, an ethoxy group, a butoxy group and a cylcohexyloxy group).

Specific examples of hindered amine include 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethylpiperidine, 4-stearoyloxy-2,2,6,6-tetramethylpiperidine, 1-ethyl-4-salicyloyloxy-2,2,6,6-tetramethylpiperidine, 4-methacryloyloxy-1,2,2,6,6-pentamethylpiperidine, 1,2,2,6,6-pentamethylpiperidine-4-yl-β(3,5-di-t-butyl-4-hydroxyphenyl)-propionate, 1-benzyl-2,2,6,6-tetramethyl-4-piperidinylmaleinate, (di-2,2,6,6-tetramethylpiperidine-4-yl)-adipate, (di-2,2,6,6-tetramethylpiperidine-4-yl)-sebacate, (di-1,2,3,6-tetramethyl-2,6-diethyl-piperidin-4-yl)-sebacate, (di-1-allyl-2,2,6,6-tetramethyl-piperidin-4-yl)-phthalate, 1-acetyl-2,2,6,6-tetramethylpiperidine-4-yl-acetate, trimellitic acid-tri-(2,2,6,6-tetramethylpiperidine-4-yl)ester, 1-acryloyl-4-benzyloxy-2,2,6,6-tetramethylpiperidine, dibutyl-malonic acid-di-(1,2,2,6,6-pentamethyl-piperidin-4-yl)-ester, dibenzyl-malonic acid-di-(1,2,3,6-tetramethyl-2,6-diethyl-piperidin-4-yl)-ester, dimethyl-bis-(2,2,6,6-tetramethylpiperidine-4-oxy)-silane, tris-(1-propyl-2,2,6,6-tetramethylpiperidine-4-yl)-phosphite, tris-(1-propyl-2,2,6,6-tetramethylpiperidine-4-yl)-phosphate, N,N'-bis-(2,2,6,6-tetramethylpiperidine-4-yl)-hexamethylene-1,6-diamine, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, N,N'-bis-(2,2,6,6-tetramethylpiperidine-4-yl)-hexamethylene-1,6-diacetamide, 1-acetyl-4-(N-cyclohexylacetamide)-2,2,6,6-tetramethyl-piperidine, 4-benzylamino-2,2,6,6-tetramethylpiperidine, N,N'-bis-(2,2,6,6-tetramethylpiperidine-4-yl)-N,N'-dibutyl-adipamide, N,N'-bis-(2,2,6,6-tetramethylpiperidine-4-yl)-N,N'-dicyclohexyl-(2-hydroxypropylene), N,N'-bis-(2,2,6,6-tetramethylpiperidine-4-yl)-p-xylylene-diamine, 4-(bis-2-hydroxyethyl)-amino-1,2,2,6,6-pentamethylpiperidine, 4-methacrylamide-1,2,2,6,6-pentamethylpiperidine and α-cyano-β-methyl-β-[N-(2,2,6,6-tetramethylpiperidine-4-yl)]-amino-methyl acrylate ester.

Further, the examples thereof include, but not limited to, a high molecular weight HALS to which a plurality of piperidine rings are linked via triazine structure, such as N,N',N'',N'''-tetrakis-[4,6-bis-[butyl-(N-methyl-2,2,6,6-tetramethylpiperidine-4-yl)amino]-triazin-2-yl]-4,7-diazadecane-1,10-diamine, a polycondensate of dibutylamine, 1,3,5-triazine.N,N'-bis(2,2,6,6-tetramethyl-4-piperidyl)-1,6-hexamethylenediamine and N-(2,2,6,6-tetramethyl-4-piperidyl)butylamine (CHIMASSORB 2020 FDL, manufactured by BASF), a polycondensate of dibutylamine, 1,3,5-triazine and N,N'-bis(2,2,6,6-tetramethyl-4-piperidyl) butylamine, poly[{(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}] (CHIMASSORB 944FDL, manufactured by BASF), a polycondensate of 1,6-hexanediamine-N,N-bis(2,2,6,6-tetramethyl-4-piperidyl) and morpholin-2,4,6-trichloro-1,3,5-triazine, and poly[(6-morpholino-s-triazin-2,4-diyl)[(2,2,6,6,-tetramethyl-4-piperidyl)imino]-hexamethylene[(2,2,6,6-tetramethyl-4-piperidyl)imino]]; and a high molecular weight HALS to which a piperidine ring is linked via ester linkage, such as a condensate of dimethyl succinate and 4-hydroxy-2,2,6,6-tetramethyl-1-piperidineethanol, and a mixed esterified product of 1,2,3,4-butanetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane.

Among them, preferred are a polycondensate of dibutylamine, 1,3,5-triazine and N,N'-bis(2,2,6,6-tetramethyl-4-piperidyl)butylamine, poly[{(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}] or a condensate of dimethyl succinate and 4-hydroxy-2,2,6,6-tetramethyl-1-piperidineethanol, and the number average molecular weight (Mn) thereof is preferably 2,000 to 5,000.

Preferred hidered amine-based compounds may be exemplified by Embodiment 1 (Sunlizer HA-622, manufactured by SORT CO., LTD.) and Embodiment 2 as follows.

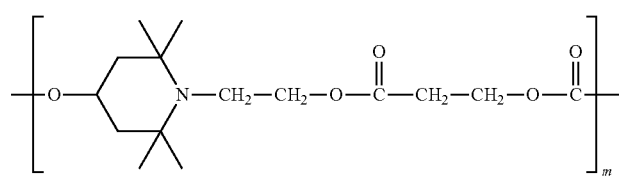

(1)

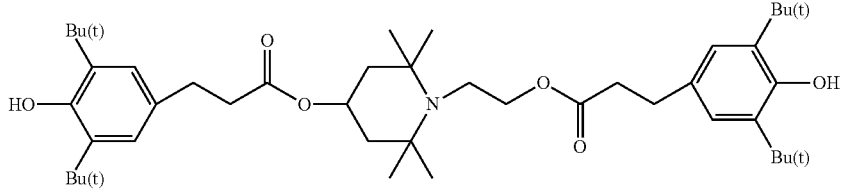

(2)

Among the above embodiments, CHIMASSORB 2020 FDL (CAS-No. 192268-64-7), CHIMASSORB 944 FDL (CAS-No. 71878-19-8) and TINUVIN 770 DF (CAS-No. 52829-07-9) manufactured by BASF (former Ciba Speciality Chemicals Inc.), and Cyasorb UV-3346 (CAS-No. 82541-48-7) and Cyasorb UV-3529 (CAS-No. 193098-40-7) manufactured by SUN CHEMICAL COMPANY LTD. are suitable because they are commercially available.

Also, the hindered amine-based compound represented by the following Formula (2) may be preferably used in the cellulose acylate of the present invention for the reason that the hindered amine-based compound has a low basicity and impart a low adverse effect on polarization performance.

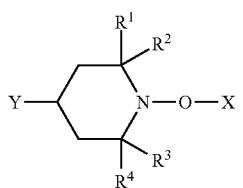

Formula (20)

In Formula (20), X represents an alkyl group or an aryl group which may be substituted, and Y represents a hydrogen atom or a substituent. Each of $R^1$ to $R^4$ independently represents an alkyl group.

X is preferably an alkyl group, more preferably a branched alkyl group, a cyclic alkyl group and an alkyl group which is substituted with an aryl group, still more preferably a cyclic alkyl group, and particularly preferably a cyclohexyl group. There is no particular limitation on the substituent with which X is substituted.

Y is preferably a substituent. Although the substituent represented by Y is not particularly limited, the substituent is preferably a substituent which is linked via a nitrogen atom or an oxygen atom to the piperidine ring, more preferably an amino group, a hydroxyl group, an alkoxy group, an aryloxy group or an acyloxy group which may be substituted, and more preferably, an amino group, an hydroxyl group, an alkoxy group or acyloxy group which is substituted with an alkyl group, an aryl group or heterocyclic group.

Each of $R^1$ to $R^4$ independently represents preferably an alkyl group having 1 to 6 carbon atoms, more preferably an ethyl group or a methyl group, and particularly preferably all methyl groups.

The hindered amine-based compound is characterized in that the nitrogen (N) in the piperidine ring especially has an ether linkage with an alkyl group or an aryl group which may be substituted with a substituent represented by X. The hindered amine-based compound having a piperidine structure represented by Formula (1) which contains the structure "N—O—X" is referred to as "$NOR^1$ type" in the present specification.

Besides, a hidered amine-based compound in which only a hydrogen is directly linked to the nitrogen (N) of the piperidine ring is referred to as "NH type", and a hindered amine-based compound in which only a methyl group is directly linked to the nitrogen (N) is referred to as "$NCH_3$ type". NH type and $NCH_3$ type are strongly basic as compared with $NOR^1$ type. Without wishing to be bound by any theory, by assembling the protective film for polarizing plate into a polarizing plate using a weak basic $NOR^1$ type hindered amine-based compound in the present invention, it is possible to suppress the performance of the polarizer from being deteriorated when used under high temperature and high humid environments for a long period of time.

The $NOR^1$ type hindered amine-based compound represented by Formula (2) is not limited so long as the compound has a desired piperidine structure. More particularly, the compound represented by the following Formula (3) or Formula (4) is preferred.

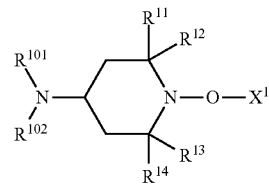

Formula (3)

In Formula (3), $X^1$ represents an alkyl group or an aryl group which may be substituted, and each of $R^{11}$ to $R^{14}$ independently represents an alkyl group. $R^{101}$ represents a hydrogen atom, an alkyl group, an aryl group or a heterocyclic group, and $R^{102}$ represents an alkyl group, an aryl group or a heterocyclic group.

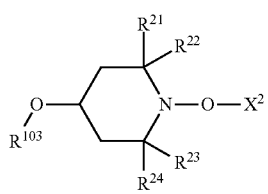

Formula (4)

In Formula (4), $X^2$ represents an alkyl group or an aryl group which may be substituted, and each of $R^{21}$ to $R^{24}$ independently represents an alkyl group. $R^{103}$ represents a hydrogen atom, an acyl group and an alkyl group.

The preferred ranges of $R^{11}$ to $R^{14}$ and $R^{21}$ to $R^{24}$ are the same as those of $R^1$ to $R^4$. In addition, the preferred ranges of $X^1$ and $X^2$ are the same as that of X.

$R^{101}$ is more preferably a hydrogen atom or an alkyl group, particularly preferably a hydrogen atom or an alkyl group having 1 to 6 carbon atoms, and more particularly preferably a propyl group or a butyl group.

$R^{102}$ is more preferably an alkyl group or a heterocyclic group, particularly preferably an alkyl group having 1 to 6 carbon atoms or a heterocyclic group having 1 to 2 nitrogen atoms in its ring, and more particularly preferably triazine.

$R^{103}$ is more preferably a hydrogen atom, an alkyl group having 1 to 12 carbon atoms, an acyl group having 1 to 12 carbon atoms or an aminoacyl group having 1 to 12 carbon atoms, and particularly preferably an acyl group having 1 to 12 carbon atoms.

In Formula (3) and Formula (4), the substituent represented by $R^{101}$ to $R^{103}$ may be further substituted, for example, with a substituent of Formula (2) from which Substituent Y is eliminated.

In Formula (3) and Formula (4), as a compound having a substituent represented by $R^{101}$ to $R^{103}$ substituted with a substituent of Formula (2) from which Substituent Y is eliminated, the compounds represented by the following Formula (5) may be exemplified.

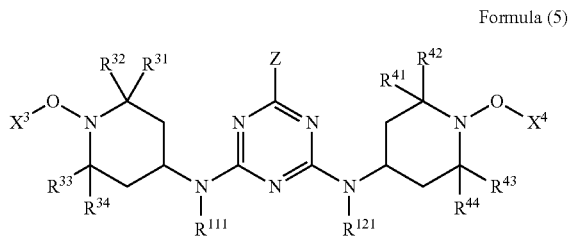

Formula (5)

In Formula (5), each of $X^3$ and $X^4$ independently represents an alkyl group or an aryl group which may be substituted, each of $R^{31}$ to $R^{34}$ and $R^{41}$ to $R^{44}$ independently represents an alkyl group, each of $R^{111}$ and $R^{121}$ independently represents a hydrogen atom, an alkyl group, an aryl group or a heterocyclic group, and Z represents a monovalent substituent.

Hereinafter, preferred examples of the hindered amine-based compound represented by Formula (2) will be described, but the present invention is not limited thereto.

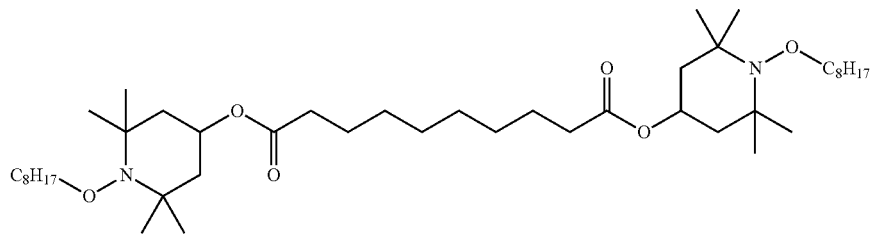

Compound A-1

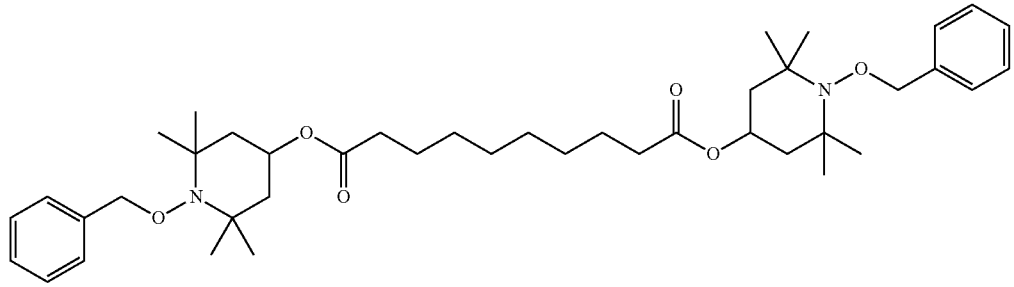

Compound A-2

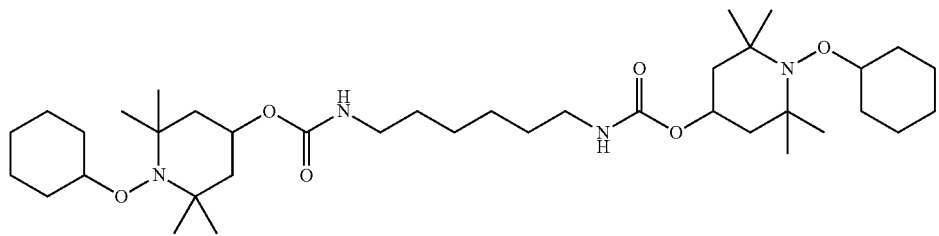

Compound A-3

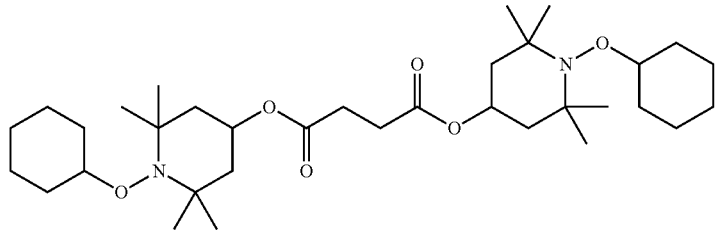

Compound A-4

-continued
Compound A-5
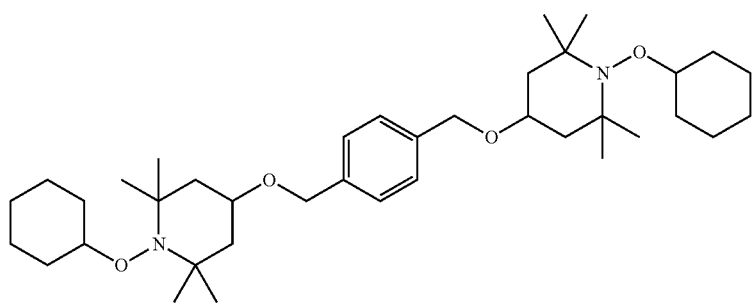
Compound A-6
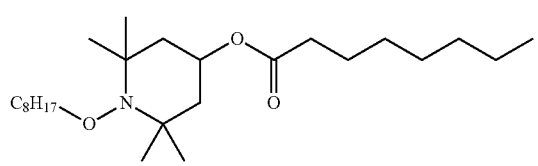
Compound A-7
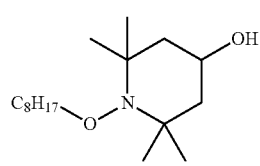
Compound A-8
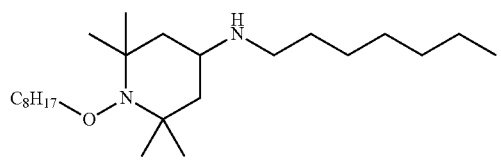
Compound A-9
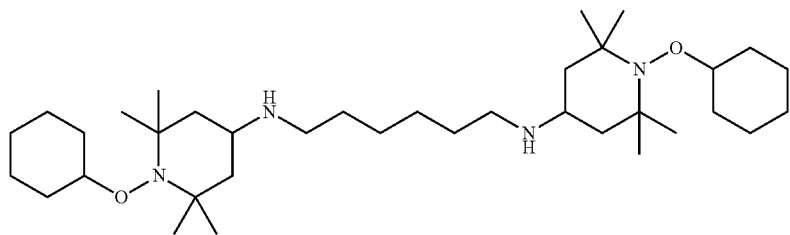
Compound A-10
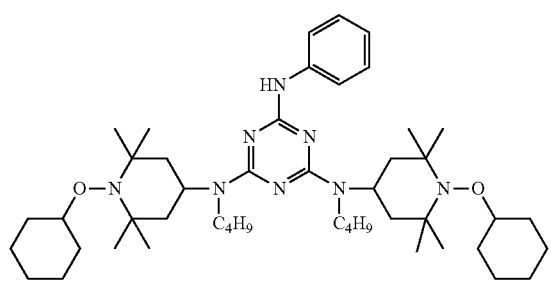
Compound A-11
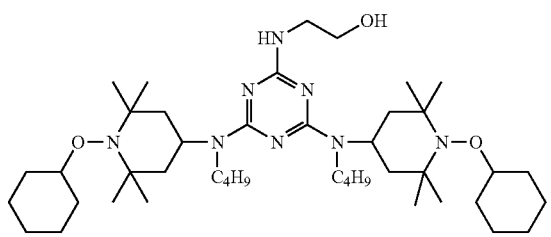
Compound A-12
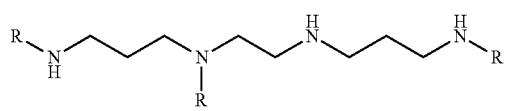
R =
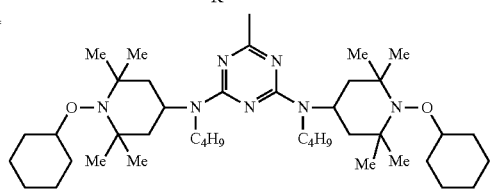

Among the above embodiments, Compound A-11 (trade name of "TINUVIN 152", manufactured by Ciba Specialty Chemicals Inc., CAS-No. 191743-75-6) and Compound A-12 (trade name of "FLAMESTAB NOR 116FF", manufactured by Ciba Specialty Chemicals Inc., CAS-No. 191680-80-6) are suitable because they are commercially available.

In addition, the following Compound H-13 (trade name of "TINUVIN 123", manufactured by Ciba Specialty chemicals Inc., CAS-No. 129757-67-1 may be preferably used.

Compound H-13

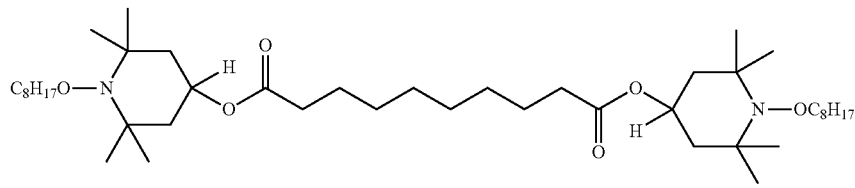

Meanwhile, although the hindered amine-based compound is commercially available as described above, the compound may be prepared by a synthesis. The synthesis of the hindered amine compound is not particularly limited, and the compound may be synthesized by any common organic synthesis. Further, any methods using distillation, recrystallization, reprecipitation, a filtering agent and an adsorbent may be suitably used as a preparation method. Further, the hindered amine-based compound is commercially obtained not only alone but also in a mixture at a low price. In the present invention, any aspect that is commercially obtained may be used regardless of a preparation method, composition, melting temperature, acid value and the like.

The hindered amine-based compound used in the present invention may be a low molecular weight compound or a polymer having repeating units. However, a high molecular weight compound is preferred in order to localize the hindered amine-based compound in vicinity of the interface between the active energy ray-cured layer and the cellulose acylate film. Meanwhile, if the molecular weight is too high, the compatibility with cellulose acylate becomes insufficient, and as a result, the haze of the film becomes high.

The hindered amine-based compound has a molecular weight of preferably 300 to 100,000, more preferably 700 to 50,000, and particularly preferably 2,000 to 30,000.

The cellulose acylate film contains 0.001% by mass to 5% by mass of the hindered amine-based compound based on cellulose acylate. The hindered amine-based compound is contained in an amount of preferably 0.01% by mass to 2% by mass, more preferably 0.05% by mass to 2% by mass, and particularly preferably 0.05% by mass to 1.0% by mass, based on an amount of cellulose acylate.

If the content of the hindered amine-based compound is less than 0.001% by mass based on the cellulose acylate film, it is difficult to sufficiently secure the adhesion between the active energy ray-cured layer and the cellulose acylate film. Meanwhile, if the content is 5% by mass or less, it is difficult to generate bleed-out of the hindered amine-based compound, and thus, it is preferred from the viewpoints of improving the polarizing performance of the polarizing plate and securing scratch resistance.

<1-3: Other Additives>

To the cellulose acylate film, various additives may be added, for example, a plasticizer such as a polycondensation polymer, phthalic ester and phosphate ester; an ultraviolet ray absorbent; an antioxidant; matting agent and the like.

The cellulose acylate film of the present invention preferably contains the compound represented by the following Formula (1) (hereinafter, referred to as "aromatic-terminal ester-based compound") from the viewpoints of reducing the free volume of the cellulose acylate film and enhancing the surface hardness. The free volume refers to a space where the chain of the cellulose acylate molecule is movable. If the free volume is reduced, the hindered amine-based compound is suppressed from being diffused, thereby enhancing the probability that the hindered amine-based compound is present in the vicinity of the cellulose acylate deteriorated by radical reaction. Therefore, it is possible to enhance the adhesion with the active energy ray-cured layer.

B-(G-A)$n$-G-B                          Formula (1)

(In the formula, each of B independently represents a benzenemonocarboxylic acid residue. Each of G independently represents an alkylene glycol residue having 2 to 12 carbon atoms, an aryl glycol residue having 6 to 12 carbon atoms or an oxyalkylene glycol residue having 4 to 12 carbon atoms. A represents an alkylenedicarboxylic acid residue having 4 to 12 carbon atoms or an arylenedicarboxylic acid residue having 6 to 12 carbon atoms. n represents an integer of 0 or more.)

The aromatic-terminal ester-based compound represented by Formula (1) is composed of a benzenemonocarboxylic acid represented by B, an alkylene glycol residue, an oxyalkylene glycol residue or an aryl glycol residue represented by G, and an alkylenedicarboxylic acid residue or an arylenedicarboxylic acid residue represented by A in Formula (1), and is obtained in the same manner as the reaction of ordinary polyester (polycondensed ester).

Meanwhile, the term "residue" as used in the present specification refers to a partial structure of the aromatic-terminal ester-based compound, and represents a partial structure having the characteristics of the monomers constituting the compound (polymer). For example, the monocarboxylic acid residue formed from the monocarboxylic acid R—COOH is R—CO—.

Examples of benzenemonocarboxylic acid in terms of the benzenemonocarboxylic acid residue include benzoic acid, p-t-butylbenzoic acid, o-toluic acid, m-toluic acid, p-toluic acid, dimethylbenzoic acid, ethylbenzoic acid, n-propylbenzoic acid, aminobenzoic acid, acetoxybenzoic acid and the like, and these may be used either alone or in a mixture of two or more thereof.

Among them, benzoic acid, o-toluic acid, m-toluic acid and p-toluic acid are preferred, and benzoic acid, o-toluic acid and m-toluic acid are more preferred.

Alkylene glycol in terms of the alkylene glycol residue is an alkylene glycol having 2 to 12 carbon atoms, preferably 2 to 6 carbon atoms, and more preferably 2 to 3 carbon atoms.

Examples of the alkylene glycol include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol and the like, and these glycol may be used either alone or in a mixture of two or more thereof.

Among them, 1,4-butanediol, ethylene glycol, 1,2-propylene glycol and 1,3-propylene glycol are preferred, and ethylene glycol, 1,2-propylene glycol and 1,3-propylene glycol are more preferred.

Oxyalkylene glycol in terms of the oxyalkylene glycol is an oxyalkylene glycol having 4 to 12 carbon atoms, preferably 4 to 8 carbon atoms, and more preferably 4 to 6 carbon atoms.

Examples of the oxyalkylene glycol include diethylene glycol, triethylene glycol, tetraethylene glycol, dipropylene glycol, tripropylene glycol and the like, and these glycols may be used either alone or in a mixture of two or more thereof.

Among them, diethylene glycol or dipropylene glycol are preferred.

Aryl glycol in terms of the aryl glycol residue is an aryl glycol having 6 to 12 carbon atoms, and preferably 6 to 8 carbon atoms.

Examples of the aryl glycol include hydroquinone, resorcin, bisphenol such as bisphenol A, and bisphenol F, and the like, and these glycol may be used either alone or in a mixture of two or more thereof.

Among them, hydroquinone and resorcin are preferred, and hydroquinone is more preferred.

Alkylenedicarboxylic acid in terms of the alkylenedicarboxylic acid residue is an alkylenedicarboxylic acid having 4 to 12 carbon atoms, preferably 4 to 10 carbon atoms, and more preferably 4 to 8 carbon atoms.

Examples of the alkylenedicarboxylic acid include succinic acid, maleic acid, fumaric acid, glutaric acid, adipic acid, azelaic acid, sebacic acid, dodecanedicarboxylic acid and the like, and these may be used either alone or in a mixture of two or more thereof.

Among them, succinic acid and maleic acid are preferred, and succinic acid is more preferred.

Arylenedicarboxylic acid in terms of the arylenedicarboxylic acid residue is an alkylenedicarboxylic acid having 8 to 14 carbon atoms, and preferably 8 to 12 carbon atoms.

Examples of the arylenedicarboxylic acid include phthalic acid, terephthalic acid, 1,5-naphthalenedicarboxylic acid, 1,4-naphthalenedicarboxylic acid and the like. These may be used either alone or in a mixture of two or more thereof.

Among them, 1,5-naphthalenedicarboxylic acid, phthalic acid terephthalic acid are preferred, and phthalic acid and terephthalic acid are more preferred.

In Formula (1), n is preferably 0 to 4, more preferably 1 to 3, and still more preferably 1 to 2.

The aromatic-terminal ester-based compound of the present invention has a number average molecular weight of preferably 300 to 2,000, and more preferably 500 to 1,500. Further, suitably, the acid value is 0.5 mg KOH/g or less and the hydroxyl value is 25 mg KOH/g or less. More preferably, the acid value is 0.3 mg KOH/g or less and the hydroxyl value is 15 mg KOH/g.

(Acid Value and Hydroxyl Value of Aromatic-Terminal Ester-Based Compound)

Here, the term "acid value" refers to the mass of potassium hydroxide in milligrams that is required to neutralize acids (carboxylic acids present at a molecular terminal) contained in one gram of a sample.

The term "hydroxyl value" refers to the mass of potassium hydroxide in milligrams that is required to neutralize acetic acids bonded with OH groups contained in one gram of a sample.

The acid value and the hydroxyl value are measured in accordance with JIS K0070.

Hereinafter, synthetic examples of the aromatic-terminal ester-based plasticizer according to the present invention will be described.

<Sample No. 1 (Aromatic-Terminal Ester Sample)>

A reaction chamber was charged collectively with 820 parts (5 mol) of phthalic acid, 608 parts (8 mol) of 1,2-propylene glycol, 610 parts (5 mol) of benzoic acid, and 0.30 parts of tetraisopropyl titanate as a catalyst, and heating was continued at 130° C. to 250° C. with stirring under a nitrogen stream while excess monohydric alcohol was refluxed with a reflux condenser until the acid value becomes 2 or less, thereby continuously removing the produced water. Subsequently, the effluent was removed at 200° C. to 230° C. under reduced pressure of $6.65 \times 10^3$ Pa and finally $4 \times 10^2$ Pa or less, and followed by filtration to obtain the aromatic-terminal ester having the following properties.

Viscosity (25° C., mPa·S): 19815
Acid value: 0.4

<Sample No. 2 (Aromatic-Terminal Ester Sample)>

The aromatic-terminal ester having the following properties was obtained in the same manner as in Sample No. 1 except that a reaction chamber was charged with 500 parts (3.5 mol) of adipic acid, 305 parts (2.5 mol) of benzoic acid, 583 parts (5.5 mol) of diethylene glycol, and 0.45 parts of tetraisopropyl titanate.

Viscosity (25° C., mPa·S): 90
Acid value: 0.05

<Sample No. 3 (Aromatic-Terminal Ester Sample)>

The aromatic-terminal ester-based plasticizer having the following properties was obtained in the same manner as in Sample No. 1 except that a reaction chamber was charged with 410 parts (2.5 mol) of phthalic acid, 610 parts (5 mol) of benzoic acid, 737 parts (5.5 mol) of dipropylene glycol, and 0.40 parts of tetraisopropyl titanate.

Viscosity (25° C., mPa·S): 43400
Acid value: 0.2

Hereinafter, specific compounds of the aromatic-terminal ester-based plasticizer according to the present invention will be illustrated, but the present invention is not limited thereto.

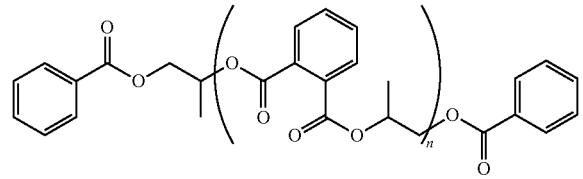

TABLE 1

| Additive | n | Molecular weight |
|----------|---|------------------|
| L-0 | 0 | 284 |
| L-1 | 1 | 491 |
| L-2 | 2 | 697 |
| L-3 | 3 | 903 |
| L-4 | 4 | 1109 |

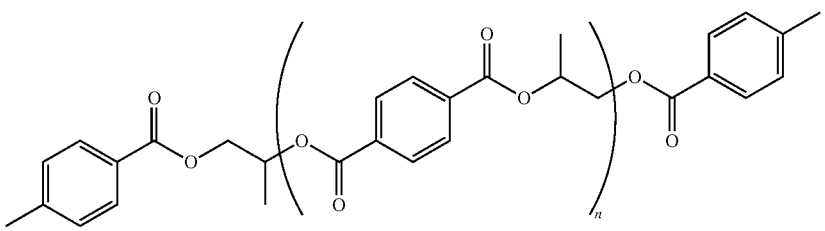

TABLE 2

| Additive | n | Molecular weight |
|---|---|---|
| M-0 | 0 | 312 |
| M-1 | 1 | 519 |
| M-2 | 2 | 725 |
| M-3 | 3 | 931 |

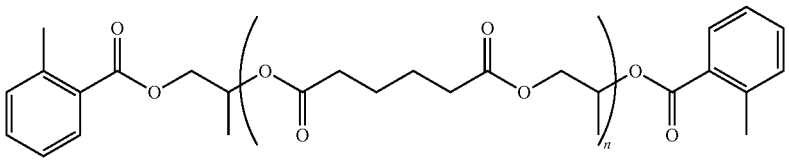

TABLE 3

| Additive | n | Molecular weight |
|---|---|---|
| N-0 | 0 | 312 |
| N-1 | 1 | 471 |
| N-2 | 2 | 657 |
| N-3 | 3 | 843 |

Further, the compound represented by the following Formula (I) may be preferably used as a hardness enhancement agent of the protective film for polarizing plate of the present invention.

Formula (I)

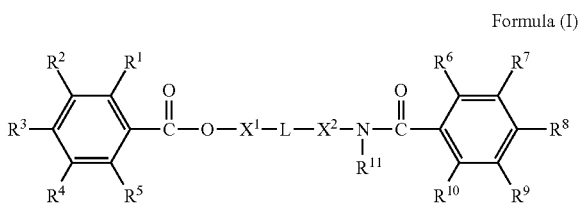

In Formula (I), each of $R^1$ to $R^7$, $R^9$ and $R^{10}$ independently represents a hydrogen atom or a substituent, $R^8$ represents a hydrogen atom or a non-conjugated substituent, each of $X^1$ and $X^2$ independently represents a single bond or an aliphatic linking group, L represents a single bond, —N($R^{12}$)— or —C($R^{13}$)($R^{14}$) and each of $R^{12}$ to $R^{14}$ independently represents a hydrogen atom or a substituent.

Each of $R^1$ to $R^7$, $R^9$ and $R^{10}$ independently represents a hydrogen atom or a substituent, preferably a hydrogen atom or non-conjugated substituent, more preferably a hydrogen atom, a halogen atom, an alkyl group or an alkoxy group, still more preferably a hydrogen atom, a fluorine atom, a chlorine atom, an alkyl group which is substituted with a fluorine atom and/or a chlorine atom, an unsubstituted alkyl group or an alkoxy group, even still more preferably a hydrogen atom, a fluorine atom, a chlorine atom, an alkyl group having 1 to 3 carbon atoms which is substituted with a fluorine atom and/or a chlorine atom, an unsubstituted alkyl group having 1 to 5 carbon atoms or an alkoxy group having 1 to 3 carbon atoms, and particularly preferably a hydrogen atom, a methyl group, an ethyl group, a methoxy group or an ethoxy group.

$R^8$ represents a hydrogen atom or non-conjugated substituent. Such a constitution can make the absorption maximum wavelength shorter than 275 nm, thereby achieving high light durability. The non-conjugated substituent in the present invention refers to a substituent that does not have a conjugating group. Examples of the conjugating group include a carbonyl group, an imino group, a vinyl group, a cyano group, a nitro group, an aromatic group and the like. $R^8$ is preferably a hydrogen atom, a halogen atom, an alkyl group or an alkoxy group, more preferably a hydrogen atom, a fluorine atom, a chlorine atom, an alkyl group which is substituted with a fluorine atom and/or a chlorine atom, an unsubstituted alkyl group or an alkoxy group, still more preferably a hydrogen atom, a fluorine atom, a chlorine atom, an alkyl group having 1 to 3 carbon atoms which is substituted with a fluorine atom and/or a chlorine atom, an unsubstituted alkyl group having 1 to 5 carbon atoms or an alkoxy group having 1 to 3 carbon atoms, and particularly preferably a hydrogen atom, a methyl group, an ethyl group, a methoxy group or an ethoxy group.

$R^{11}$ represents a hydrogen atom or a substituent, and preferably a hydrogen atom or a non-conjugated substituent. As a substituent, $R^{11}$ is more preferably a hydrogen atom, an alcohol group or an alkyl group, still more preferably a hydrogen atom or a primary alcohol group having 1 to 3 carbon atoms, and particularly preferably a hydrogen atom.

Each of $X^1$ and $X^2$ is a single bond or an aliphatic linking group.

The aliphatic linking group refers to a non-aromatic group essentially containing carbon atoms. Specifically, examples thereof include an aliphatic hydrocarbon group (for example, an alkylene group, an alkynylene group or an akenylene group) or a group obtained by combining an aliphatic hydrocarbon group and other groups. Examples thereof also include an aliphatic hydrocarbon group, a group obtained by combining an aliphatic hydrocarbon group and at least one of —O—, —C(=O)— and —S—. An alkylene group or a group obtained by combining an alkylene group and —O— is more preferred, an alkylene group is still more preferred, and an unsubstituted alkylene group is particularly preferred. The aliphatic linking group preferably has 1 to 3 carbon atoms.

L represents a single bond, —N($R^{12}$)— or —($R^{13}$)($R^{14}$)—, and each of $R^{12}$ to $R^{14}$ represents a hydrogen atom or a substituent.

$R^{12}$ represents a hydrogen atom or a substituent, and preferably a hydrogen atom or a non-conjugated substituent. As a substituent, $R^{12}$ is more preferably a hydrogen atom, an alcohol group, an alkyl group or a group represented by the following Formula (IV), still more preferably a hydrogen atom, a primary alcohol group having 1 to 3 carbon atoms, an alkyl group having 1 to 5 carbon atoms or a group represented by the following Formula (IV), and particularly preferably a group represented by the following Formula (IV).

Each of $R^{13}$ and $R^{14}$ represents a hydrogen atom or a substituent, and preferably a hydrogen atom or a non-conjugated substituent.

As a substituent, each of $R^{13}$ and $R^{14}$ is more preferably a hydrogen atom, an alcohol group, an alkyl group, a hydroxyl group, a group represented by the following Formula (II) or a group represented by the following Formula (III), and still more preferably a hydrogen atom, a primary alcohol group having 1 to 3 carbon atoms, an alkyl group having 1 to 5 carbon atoms, a hydroxyl group, a group represented by the following Formula (II) or a group represented by the following Formula (III).

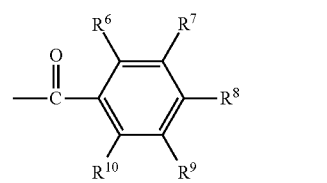

Formula (II)

In Formula (II), each of $R^6$, $R^7$ and $R^9$ to $R^{11}$ independently represents a hydrogen atom or a substituent, $R^8$ represents a hydrogen atom or a non-conjugated substituent, and $X^2$ represents a single bond or an aliphatic linking group.

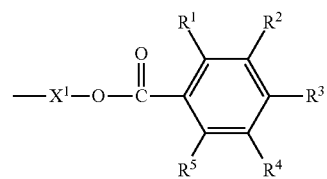

Formula (III)

In Formula (III), each of $R^1$ to $R^5$ independently represents a hydrogen atom or a substituent, and $X^1$ represents a single bond or an aliphatic linking group.

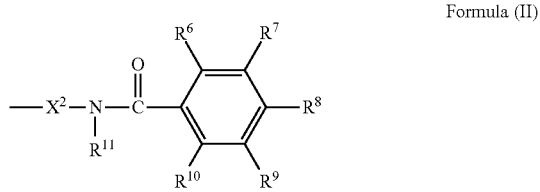

Formula (IV)

In Formula (IV), each of $R^6$, $R^7$, $R^9$ and $R^{10}$ independently represents a hydrogen atom or a substitutent, and $R^8$ represents a hydrogen atom or a non-conjugated substituent.

Each of $R^6$ to $R^{11}$ and $X^2$ in Formula (II) has the same meaning as $R^6$ to $R^{11}$ and $X^2$ in Formula (I), the preferred ranges ditto.

Each of $R^1$ to $R^5$ and $X^1$ in Formula (III) has the same meaning as $R^1$ to $R^5$ and $X^1$ in Formula (I), the preferred ranges ditto.

Each of $R^6$ to $R^{10}$ in Formula (IV) has the same meaning as $R^6$ to $R^{10}$ in Formula (I), the preferred ranges ditto.

The molecular weight of the compound represented by Formula (I) is preferably 250 to 600, and more preferably 350 to 500.

Hereinafter, compounds represented by Formula (I) preferably used in the present invention will be exemplified, but the present invention is, of course, not limited thereto.

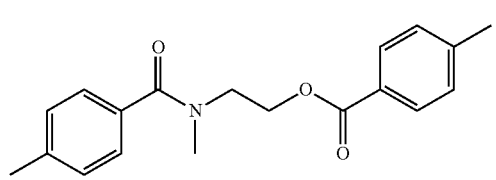

1

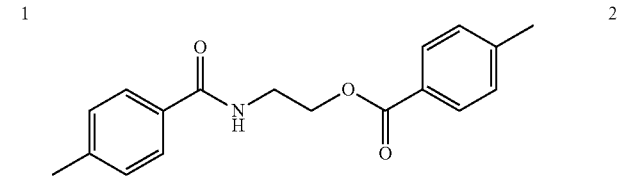

2

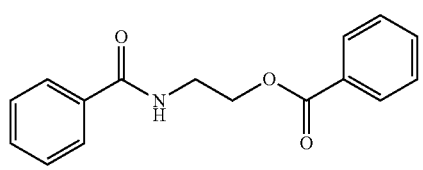

3

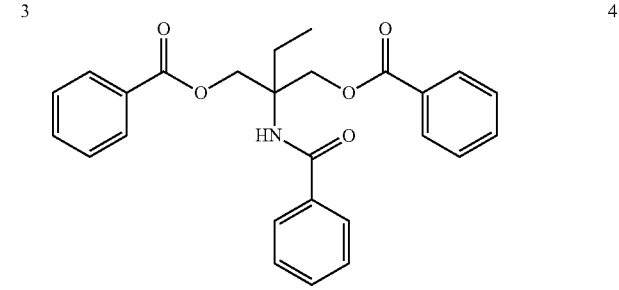

4

-continued
5
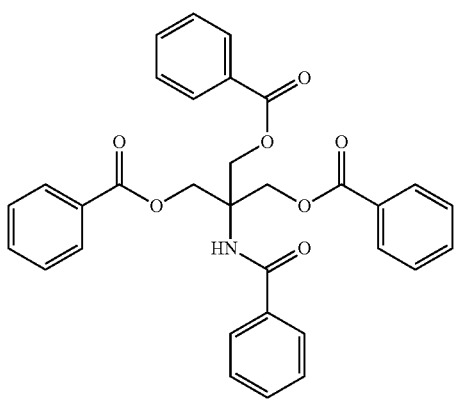
6
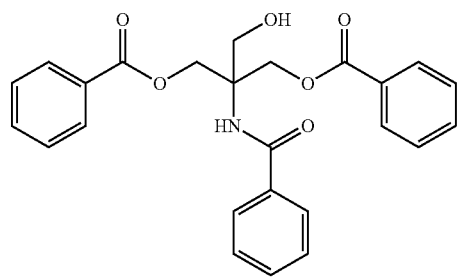
7
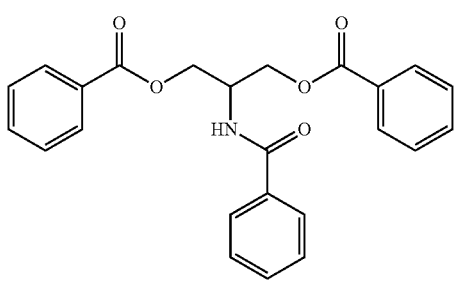
8
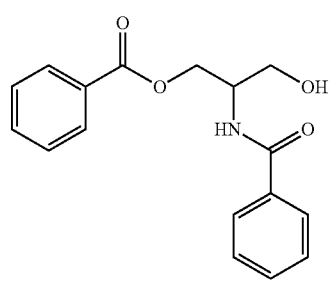
9
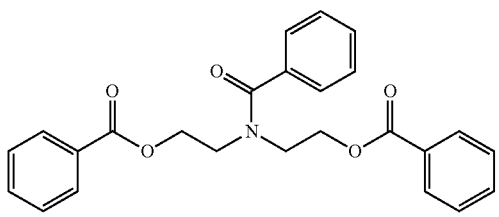
10
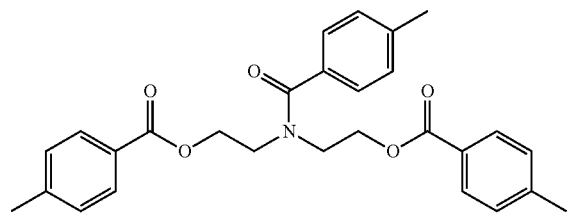
11
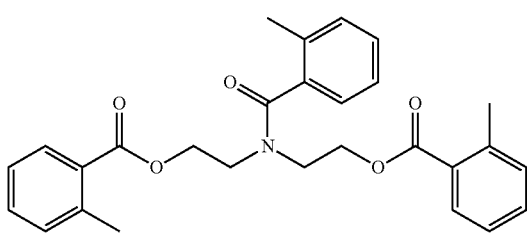
12
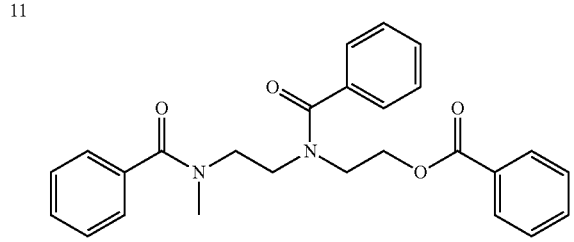
13
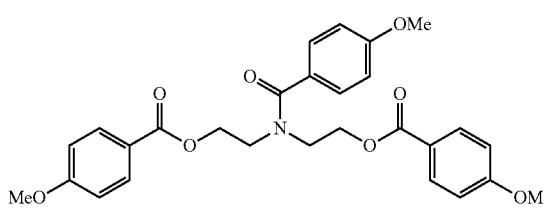
14
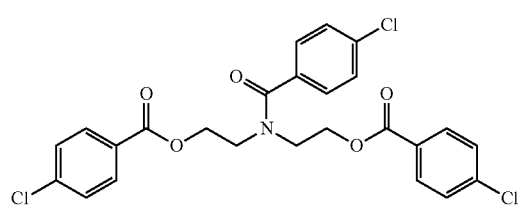

-continued
15
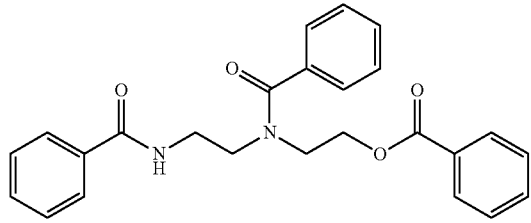
16
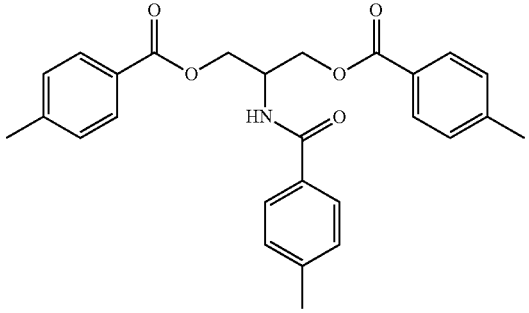
17
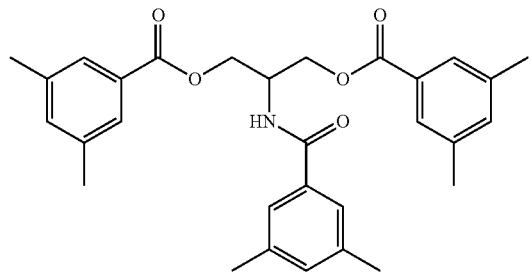
18
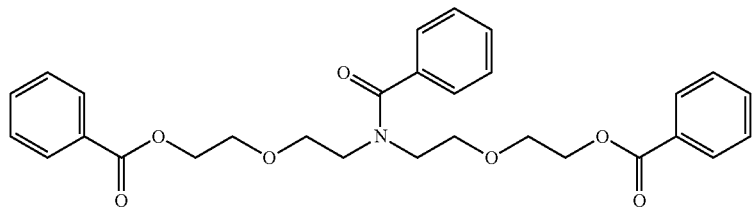
19
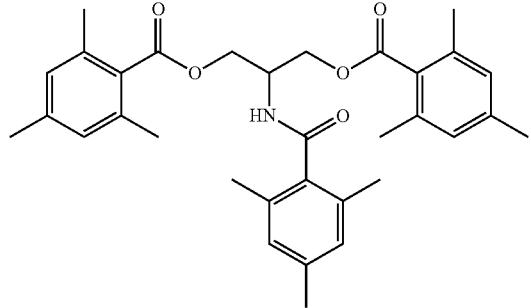
20
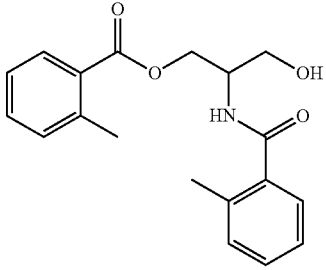
21
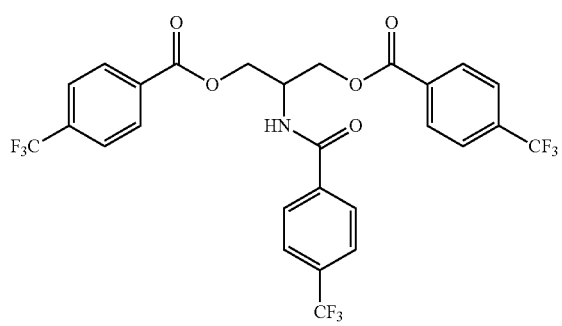
22
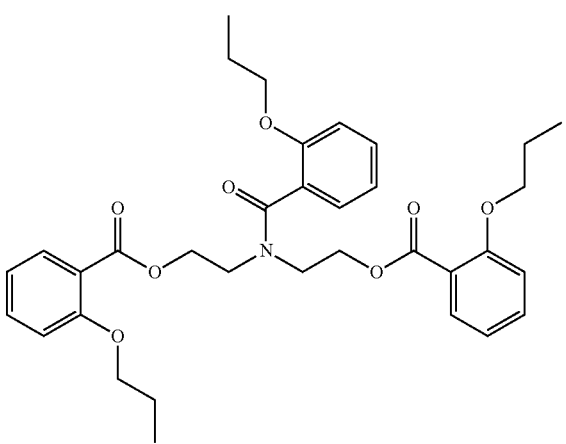

-continued
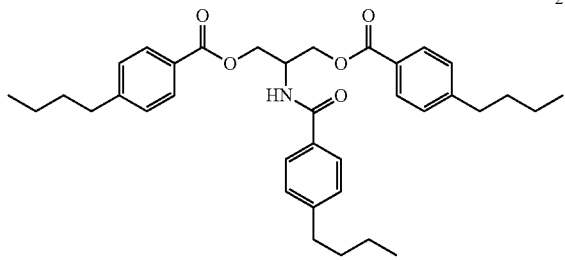
23
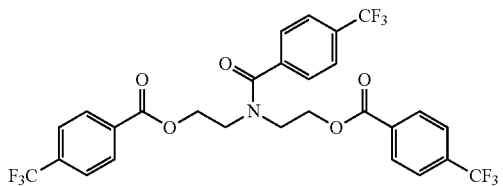
24
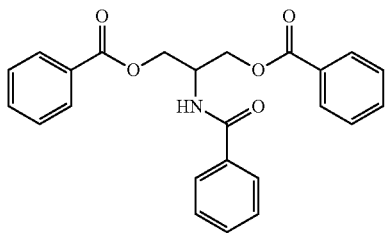
25
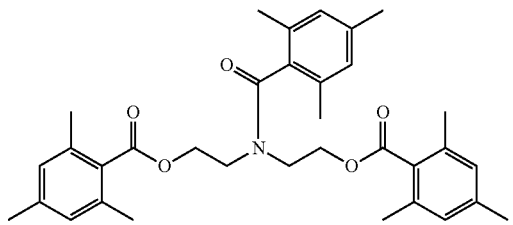
26
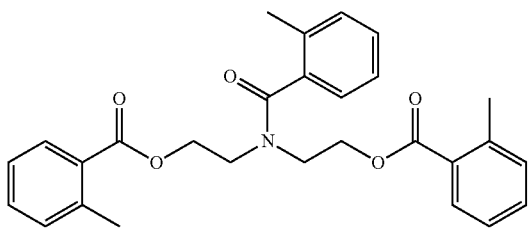
27
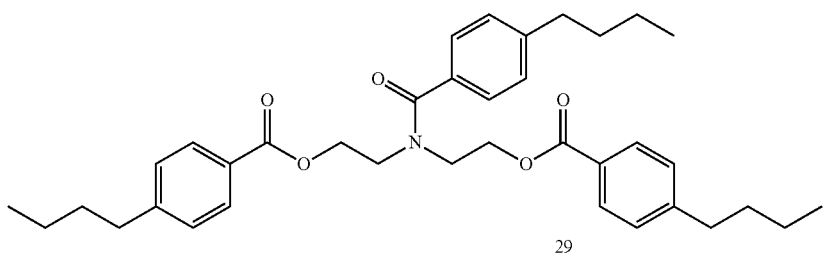
28
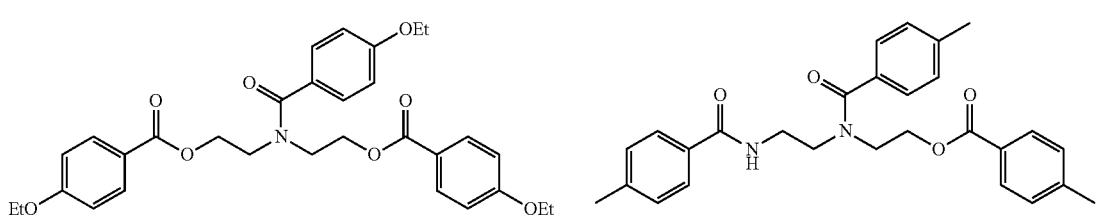
29
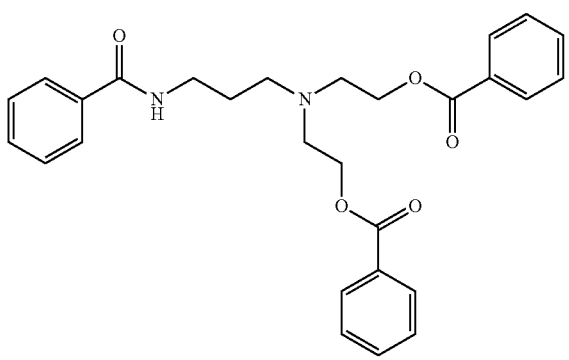
31
30

The compound represented by Formula (1) and Formula (I) used in the present invention is contained in the cellulose acylate film in a content of preferably 2% by mass to 20% by mass, and more preferably 5% by mass to 15% by mass based on cellulose acylate.

In the cellulose acylate film of the present invention, two or more kinds of the compound represented by Formula (1) and Formula (I) may be contained from the viewpoint of reducing the haze of the film. When using two or more kinds, it is preferred that the sum of the contents is within the above range. When using two or more kinds, it is particularly preferred that n in the above structure is mixed with other compounds from the viewpoint of reducing the haze of the film.

(Antioxidant)

In the present invention, in addition to the hindered amine-based compound, it is possible to add any known antioxidant, for example, a phenol-based or hydroquinone-based antioxidant such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone and pentaerythrityl-tetrakis[3-(3,5-di-tert-butyl-4-hydroxyphenyl)propionate] to the cellulose acylate film. Furthermore, a phosphorous-based antioxidant such as tris(4-methoxy-3,5-diphenyl)phosphite, tris(nonylphenyl)phostphite, tris(2,4-di-tert-butylphenyl) phosphite, bis(2,6-di-tert-butyl-4-methylphenyl) pentaerythritol diphosphite, bis(2,4-di-tert-butylphenyl) pentaerythritol dihosphite. The amount of antioxidant added other than the hindered amine-based compound is preferably 0.05 parts by mass to 5.0 parts by mass based on 100 parts by mass of cellulose acylate.

(Ultraviolet Ray Absorbent)

In the present invention, an ultraviolet ray (UV) absorbent may be added to the cellulose acylate film from the viewpoint of suppressing deterioration of polarizing plates or liquid crystals. As the UV absorbent, it is preferred to use those which are excellent in ability to absorb UV at a wavelength of 370 nm or less and low in absorption of visible light at a wavelength of 400 nm or more from the viewpoint of excellent liquid crystal display performance.

Specific examples of the UV absorbent that is preferably used in the present invention may include a hindered phenol-based compound, an oxybenzophenone-based compound, a benzotriazole-based compound, a salicylic acid ester-based compound, a benzophenone-based compound, a cyano acrylate-based compound, a nickel complex salt-based compound and the like.

Examples of the hindered phenol-based compound include 2,6-di-tert-butyl-p-cresol, pentaerythrityl-teterakis[3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl) benzene, tris-(3,5-di-tert-butyl-4-hydroxybenzyl)-isocyanurate and the like.

Examples of the benzotriazole-based compound include 2-(2'-hydroxy-5'-methylphenyl)benzotriazole, 2,2-methylenebis(4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2(2'-hydroxy-3',5'-di-tert-butylphenyl)-5-chlorobenzotriazole, (2(2'-hydroxy-3',5'-di-tert-amylphenyl)-5-chlorobenzotriazole, 2,6-di-tert-butyl-p-cresol, pentaerythrityl-tetrakis[3-(3,5-di-tert-butyl-4-hydroxyphenyl)propionate] and the like.

The amount of the UV absorbent added is preferably 1 ppm to 1.0% by mass, and more preferably 10 ppm to 1000 ppm based on cellulose acylate in mass ratio.

(Matting Agent)

In the present invention, a matting agent may be added to the cellulose acylate film from the viewpoints of the film slipping property and stable manufacturing. The matting agent may be any matting agent of organic compounds or inorganic compounds.

Examples of the matting agent of inorganic compounds preferably include an inorganic compound containing silicon (for example, silicon dioxide, calcined calcium silicate, hydrated calcium silicat, aluminum silicate, magnesium silicate and the like), titanium dioxide, zinc oxide, aluminum oxide, barium oxide, zirconium oxide, strontium oxide, antimony oxide, antimony tin oxide, calcium carbonate, talc, clay, calcined kaolin and calcium phosphate, and more preferably an inorganic compound containing silicon or zirconium oxide. However, silicon dioxide is particularly preferably used in that the turbidity of the cellulose acylate film can be reduced. As fine particles of the silicon dioxide, commercially available products, for example, AEROSIL R972, R974, R812, 200, 300, R202, OX50, TT600 (all manufactured by Nippon Aerosil Co., Ltd.) may be used. As fine particles of the zirconium oxide, commercially available products, for example, AEROSIL R976 and R811 (all manufactured by Nippon Aerosil Co., Ltd.) may be used.

Preferred examples of the matting agent of organic compounds include polymers such as silicone resins, fluorine resins and acrylic resins. Among them, silicone resins are preferably used. Among the silicone resins, a silicone resin with a three dimensional mesh structure is particularly preferred. For example, a commercially available product such as TOSPEARL 103, TOSPEARL 105, TOSPEARL 108, TOSPEARL 120, TOSPEARL 145, TOSPEARL 3120 and TOSPEARL 240 (all manufactured by Toshiba Silicones Co., Ltd.) may be used.

When these matting agents are added to a cellulose acylate solution, any methods may be used without specific limitation so long as the desired cellulose acylate solution can be obtained. For example, an additive may be contained at a step of mixing cellulose acylate and a solvent, or an additive may be added after preparing a mixed solution with cellulose acylate and a solvent. Furthermore, a dope may be added and mixed immediately before casting, which is so-called an immediately preceding addition method, and the mixing is performed by a screw type kneader installed on line. Specifically, a static mixer such as an in-line mixer is preferred. In addition, an in-line mixer, for example, Static Mixer SWJ (TORAY static in-tube mixer, Hi-Mixer) (manufactured by Toray Engineering Co., Ltd.) is preferable. Meanwhile, in order to avoid uneven concentration, coagulation of particles and the like with respect to the in-line addition, Japanese Patent Application Laid-Open No. 2003-053752 discloses a method for preparing a cellulose acylate film, in which a distance (L) between a front end of an addition nozzle mixing a main material dope with an additive liquid of a different composition and a starting end portion of an in-line mixer is set to be not more than five times of the inner diameter (d) of a main material pipe, thereby avoiding uneven concentration, coagulation of matting particles and the like. In a more preferred aspect, it is disclosed that the distance (L) between the front end opening of a supply nozzle supplying a main material dope and an additive liquid of a different composition and a starting end portion of an in-line mixer is set to be not more than ten times of the inner diameter (d) of the front end opening of the supply nozzle, and that the in-line mixer is a static non-stirring in-pipe mixer or a dynamic stirring in-pipe mixer. More specifically, it is disclosed that the flow rate ratio of the main material dope of the cellulose acylate/the in-line additive liquid is 10/1 to 500/1, and preferably 50/1 to 200/1. In addition, in Japanese Patent Application Laid-Open No. 2003-014933, the object of which is to provide a phase difference film which exhibits reduced bleed-out of additives, and does not suffer from an interlayer peeling phenomenon, and furthermore, exhibits a good slipping property and an excellent transparency, a method for adding an additive is disclosed, in which an additive may be added to a melting pot, or an additive or an additive dissolved or dispersed solution may be added to a dope in delivery at a location between the melting pot and a co-casting die. However, it is disclosed that, in the case of the latter, it is preferred to provide a means for mixing such as a static mixer in order to enhance the mixability.

In the cellulose acylate film, if the matting agent is not added in a large amount, the haze of the film does not increase. Therefore, when practically used in LCDs, it is difficult to generate problems such as contrast degradation and bright spot generation. In addition, if not too little, it is possible to achieve the scratch resistance. From these viewpoints, the matting agent is preferably contained in the cellulose acylate film in a content of 0.01% by mass to 5.0% by mass, more preferably 0.03% by mass to 3.0% by mass, and particularly preferably 0.05% by mass to 1.0% by mass based on cellulose acylated.

<1-4: Physical Properties of Cellulose Acylate Film>
(Surface Hardness)

The cellulose acylate film of the present invention is characterized in that a minimum value of Knoop hardness of a Knoop indenter is 170 $N/mm^2$ to 220 $N/mm^2$, and the Knoop hardness is measured several times at the same position by a Knoop indenter, the Knoop indenter is rotated by a given angle in each measurement, and a rotation axis of the Knoop indenter is orthogonal to an upper surface of the cellulose acylate film. The surface hardness (Knoop hardness) is measured by a nanoindentation method. Here, JIS Z 2251 is Japanese Industrial Standards, which is defined based on ISO4545.

For example, in an exemplary embodiment of the present invention, it is preferred that, at the same press position, measurements for Knoop hardness are carried out in 18 directions when rotating the Knoop indenter by 10° from 0° to 180°.

The surface hardness is preferably 180 $N/mm^2$ to 220 $N/mm^2$, and more preferably 180 $N/mm^2$ to 200 $N/mm^2$.

It is believed that a high surface hardness makes the free volume of the cellulose acylate film small, and thus, it is difficult for additives to be diffused into the surface of the cellulose acylate film. Accordingly, by setting the surface hardness to 170 $N/mm^2$ or more, the hindered amine-based compound is not eluted to the active energy ray-cured layer such as a hardcoat layer on the cellulose acylate film, but is retained on the surface of the cellulose acylate film. As a result, it is possible to effectively suppress the depolymerization of cellulose acylate by radicals generated by light irradiation, thereby improving the adhesion between the active energy ray-cured layer and the cellulose acylate film. Meanwhile, by setting the surface hardness to 220 $N/mm^2$ or less, it is possible to suppress the deterioration of the adhesion between the active energy ray-cured layer and the cellulose acylate film due to the brittle fracture of cellulose acylate.

The surface hardness of the cellulose acylate film may be enhanced by the aromatic terminal ester compound represented by the above Formula (1) and the compound represented by the above Formula (I). Also it is effective for enhancing the surface hardness of the cellulose acylate film to enhance the crystallinity of the cellulose acylate film by peeling off a film from a support in a state with large volatile content, after casting, and then drying at a high temperature. Further, it is also to possible that the surface hardness of the cellulose acylate film is enhanced by increasing degree of alignment in cross section.

(Degree of Alignment)

The degree of alignment of the cellulose acylate of the present invention in the thickness direction of the cellulose acylate (hereinafter, referred to as "Pz") is preferably 0.100 to 0.150, and more preferably 0.110 to 0.140.

Setting Pz within the above range is preferred in that the surface hardness becomes higher and the adhesion between the active energy ray-cured layer and the cellulose acylate film is maintained when irradiated with light.

The degree of alignment of the cellulose acylate film in the thickness direction of the cellulose acylate film may be determined by dividing the cross-section in parallel to the conveying direction and the thickness direction of the film into five portions from the support side when film forming to the air interface side, measuring the degrees of alignment of the cross-section of the film at each portion using X-ray beams of several μm to dozens of and calculating the average of the five portions.

The degree of alignment of the cellulose acylate film in the thickness direction of the cellulose acylate film may be adjusted by stretching treatment of the cellulose acylate film, or drying conditions during film forming and heat treatment after film forming.

(Degree of Crystallization)

The crystallization amount contained in the cellulose acylate film of the present invention may be estimated by the difference between the cold crystallization peak area (hereinafter, ΔHc) and the crystal melting peak area (hereinafter, ΔHm) in differential scanning calorimetry (DSC). That is, the higher the value of (ΔHm-ΔHc) is, the more the crystallization amount in the cellulose acylate film is.

The value of (ΔHm-ΔHc) of the cellulose acylate film of the present invention is preferably 10 J/g to 18 J/g, and more preferably 12 J/g to 16 J/g.

Setting the crystallization amount within the above range is preferred in that the adhesion between the active energy ray-cured layer and the cellulose acylate film is maintained when irradiated with light.

The crystallization amount of the cellulose acylate film may be adjusted by the kind and amount of an additive, the residual solvent amount and the dry temperature.

(Haze)

The cellulose acylate film preferably has a haze of less than 0.20%, more preferably less than 0.15%, and particularly preferably less than 0.10%. By setting the haze to less than 0.2%, it is possible to improve the contrast ratio when incorporated into the liquid crystal display device. In addition, it is advantageous in that the transparency of the film becomes higher, thereby making the film easy to be used as an optical film.

(Film Thickness)

The cellulose acylate film preferably has an average film thickness of 30 μm to 100 μm, more preferably 30 μm to 80 and still more preferably 30 μm to 70 μm. Setting the film thickness to 30 μm or more is preferred in that the handling property when preparing a web shaped film is enhanced. In addition, by setting the film thickness to 70 μm or less, it is easy to cope with a change in humidity, and to maintain the optical properties.

(Film Width)

The cellulose acylate film preferably has a film width of 700 mm to 3000 mm, more preferably 1,000 mm to 2,800 mm, and particularly preferably 1,470 mm to 2,500 mm.

<1-5: Preparation of Cellulose Acylate Film>

Hereinafter, a method for preparing the cellulose acylate film used in the present invention will be described in detail.

The cellulose acylate film is preferably prepared by a solvent casting method. For preparation examples of the cellulose acylate film using the solvent casting method, see U.S. Pat. Nos. 2,336,310, 2,367,603, 2,492,078, 2,492,977, 2,492,978, 2,607,704, 2,739,069 and 2,739,070; GB Patent No. 640731 and 736892; and Japanese Patent Publication Nos. S45-4554 and S49-5914, Japanese Patent Application Laid-Open S60-176834, S60-203430 and S62-115035. Further, the cellulose acylate film may be subjected to stretching treatment. For methods and conditions for stretching treatment, see Japanese Patent Application Laid-Open Nos. S62-115035, H4-152125, H4-284211, H4-298310 and H11-48271.

(Casting Method)

Solution casting methods may include a method for uniformly extruding a prepared dope from a pressure die onto a metal support, a doctor blade method for adjusting the film thickness of a dope first cast on a metal support by a blade, a reverse roll coater method for adjusting with a reverse rotating roll, and the like, but a method by a pressure die is preferred. The pressure die includes a coat hanger type or a T die type, and any of them may be preferably used. In addition to the methods exemplified herein, various methods may be performed to cast and film-form a previously known cellulose acetate solution. And, by setting each condition in consideration of the difference in the boiling points of solvents used, it is possible to obtain the same effects as in the contents described in each publication.

As an endless driving metal support used in preparing the cellulose acylate film, a drum of which the surface is mirror-finished by chromium plating, or a stainless steel belt (also referred to as a band) mirror-finished by surface polishing may be used. One or two or more of pressure dies may be installed in the upper side of the metal support. One or two dies are preferred. When two dies are installed, the amount of a dope to be cast may be divided at various ratios into each die, or the dope may be conveyed from a plurality of precise metering gear pumps at each ratio to the dies. The temperature of the dope (resin solution) used in casting is preferably −10° C. to 55° C., and more preferably 25° C. to 50° C. In that case, the temperature of the solution may be all the same through the process, or may be different in different parts of the process. In another case, the temperature may become a desired temperature immediately before casting.

In addition, the material of the metal support is not particularly limited, but SUS products (for example, SUS316) are more preferred.

(Stretching Treatment)

The method for preparing the cellulose acylate film preferably includes a stretching step after a film-forming step. As described above, the cellulose acylated film of the present invention preferably has a degree of alignment in the thickness direction within a certain range, but it is possible to increase the degree of alignment in the thickness direction by stretching treatment. The stretching direction of the cellulose acylate film may be either a film conveying direction or an orthogonal direction (width direction) to the conveying direction.

A method for stretching the film in the width direction is described in, for example, Japanese Patent Application Laid-Open Nos. S62-115035, H4-152125, H4-284211, H4-298310, H11-48271 and the like. In the case of stretching in the longitudinal direction, the film is stretched when the film winding speed is set to be faster than the film peeling-off speed, for example, by adjusting the speed of the conveying rollers of the film. In the case of stretching in the width direction, the film may be stretched by conveying the film while holding the width of the film with a tenter, and extending the width of the tenter gradually. After drying the film, it is also possible to stretch the film by using an extruder (preferably uniaxial stretching by using a long extruder).

The stretching ratio of the cellulose acylate film is preferably 1% to 100%, more preferably 5% to 60%, and particularly preferably 10% to 40%.

Specifically, in stretching in the width direction, the stretching ratio is preferably 5% to 30%, and more preferably 8% to 20%.

Further, stretching may be performed in both of the conveying direction and the width direction. In this case, it is preferred that the stretching ratio in the conveying direction is 1% to 20% and the stretching ratio in the width direction is 5% to 30%. It is more preferred that the stretching ratio in the conveying direction is 1% to 8% and the stretching ratio in the width direction is 10% to 20%.

In the case of using the cellulose acylate film as a protective film of a polarizer, it is required to arrange the transmission axis of the polarizer and the in-plane slow axis of the resin film of the present invention in parallel in order to suppress light leakage when seen obliquely. Since the transmission axis of the roll film type polarizer produced continuously is generally parallel to the width direction of the roll film, the in-plane slow axis of the roll film type protective film is needed to be parallel to the width direction of the film in order to continuously attach the roll film type polarizer and the protective film composed of the roll film type cellulose acylate film with each other. Accordingly, it is preferred to stretch in the width direction as much as possible. In addition, the stretching treatment may be performed during the film forming step or a raw fabric that has been film formed and wound may be subjected to stretching treatment. However, in the preparation method of the present invention, it is preferred to peel the film from the support and then stretch the film in a state where the residual solvent is contained, that is, to stretch the film during the film forming step.

The residual solvent amount at the time of peeling from the support is preferably 10% by mass to 100% by mass, and more preferably 15% by mass to 60% by mass.

Here, the residual solvent amount may be calculated by the following equation.

$$\text{Residual solvent amount (\% by mass)} = \{(M-N)/N\} \times 100$$

[In the equation, M represents the mass of the cellulose acylate film before drying, and N represents the mass of the cellulose acylate film after drying the film at 110° C. for 3 hours.

(Drying)

The method for preparing the cellulose acylate film preferably include drying the cellulose acylate film, and stretching the dried cellulose acylate film at a temperature of Tg-10° C. or higher from the viewpoint of retardation development.

Generally, drying the dope on the metal support with respect to the preparation of the cellulose acylate film includes a method of applying a hot air to the front surface side of a metal support (a drum or a belt), that is, the surface of a web on a metal support, a method of applying a hot air to the rear surface of a drum or a belt, a rear surface liquid heat transfer method of bringing a temperature-controlled liquid into contact with the rear surface opposite to dope casting surface of a drum or a belt, and heating the drum or the belt by heat transfer to control the surface temperature, and the like, in which the rear surface liquid heat transfer method is preferred. The surface temperature of the metal support before casting may be any temperature below the boiling point of the solvent used in the dope. However, in order to facilitate drying, and to render fluidity on the metal support to be lost, it is preferred to set the temperature to be 1° C. to 10° C. lower than the boiling point of the solvent which has the lowest boiling point among the solvents used. Meanwhile, the case where the cast dope is cooled to be peeled off without drying is not limited thereto.

(Peeling)

The method for preparing the cellulose acylate film preferably includes peeling-off the dope film from the metal support. Peeling in the method for preparing the cellulose acylate film is not particularly limited, and the peeling property may be improved by using any known methods.

The film thickness may be adjusted to a desired thickness by adjusting the solid content contained in the dope, the slit gap of the intake of the die, the extrusion pressure from the die, the speed of the metal support and the like.

The cellulose acylate film thus obtained is preferably wound to 100 m to 10,000 m, more preferably 500 m to 7,000 m, and more preferably 1,000 m to 6,000 m in length per roll. At the time of winding, at least one end is preferably knurled. The width of knurling is preferably 3 mm to 50 mm, and more preferably 5 mm to 30 mm, and the height of knurling is 0.5 μm to 500 μm, and more preferably 1 μm to 200 μm. It may be one side pushing or both side pushing.

Since the deterioration of contrast and the color sensitivity in an oblique direction generally become remarkable in large screen display devices, the above-described cellulose acylate film is especially suitable for use in large screen liquid crystal display devices. When used as an optically-compensatory film for large screen liquid crystal display devices, it is preferred to form the film to be 1,470 mm or more in width. Further, the protective film for polarizing plate of the present invention includes a film in an aspect of a film piece that is cut to a size capable of being incorporated as it is into a liquid crystal display device, as well as a film in an aspect of a wound film that is manufactured in a long shape by continuous production and wound in a roll shape. The protective film for polarizing plate in the latter aspect is stored or conveyed as it is, and is used by cutting it to a desired size when incorporated into a liquid crystal display device or bonded to a polarizer and the like in practice. Further, the protective film for polarizing plate is used by cutting it to a desired size when incorporated into a liquid crystal display device in practice after bonded in a long shape as it is to a polarizer composed of a polyvinyl alcohol film manufactured similarly in a long shape. As an aspect of an optically-compensatory film that is wound in a roll shape, it may be exemplified by an aspect that is wound in a roll shape, in which the roll length is 2500 m or more.

2. Active Energy Ray-Cured Layer

The protective film for polarizing plate of the present invention is characterized by having an active energy ray-cured layer laminated on the cellulose acylate film. In the present specification, the term "active energy ray-cured layer" refers to a layer in which a resin curable by an active energy ray is contained, and the resin is cured by the active energy ray.

The term "active energy ray" as used in the present specification is not particularly limited so long as the ray can impart an energy capable of generating an initiating species by its irradiation, and includes, in a broad way, an α-ray, a γ-ray, an ultraviolet ray, a visible ray, an electron beam and the like. Among them, an ultraviolet ray and an electron beam are preferred, and an ultraviolet ray is particularly preferred, from the viewpoints of cure sensitivity and apparatus availability.

Hereinafter, the active energy ray-cured layer will be described.

<2-1: Kind of Active Energy Ray-Cured Layer>

The active energy ray-cured layer in the protective film for polarizing plate of the present invention preferably has functions such as forward scattering, anti-glare, gas barrier, slip, antistatic, undercoat, hardcoat, anti-reflection and protection. That is, the active energy ray-cured layer is preferably a functional layer such as a forward scattering layer, an anti-glare layer, a gas barrier layer, a slip layer, an antistatic layer, an undercoat layer, a hardcoat layer, an antireflection layer, or a protective layer. The active energy ray-cured layer is more preferably an antireflection layer or a hardcoat layer, and particularly preferably a hardcoat layer.

Such an active energy ray-cured layer is preferably formed on at least one surface of the protective film for polarizing plate of the present invention. Further, when a polarizing plate is constituted by combining the protective film for polarizing plate of the present invention with a polarizer, the active energy ray-cured layer may be installed on any one of the polarizer side and the opposite side to the polarizer (a side closer to an air side), or both of them.

Now, the functional layers used as an active energy ray-cured layer in the present invention will be described.

Meanwhile, the protective film for polarizing plate of the present invention is characterized by having at least one active energy ray-cured layer on the cellulose acylate film. The protective film for polarizing plate may have functional layers that are active energy ray-curable as described below, as well as other functional layers that are not active energy ray-curable as described below. Further, a single or a plurality of active energy ray-cured layers may be formed in the protective film for polarizing plate of the present invention. Further, the individual active energy ray-cured layers may be the same as or different from each other.

(1) Hardcoat Layer

The protective film for polarizing plate of the present invention is preferably formed with a hardcoat layer as an active energy ray-cured layer on the surface of the cellulose acylate film in order to impart a mechanical strength such as stretch resistance.

The film thickness of the hardcoat layer is preferably 0.2 μm to 100 μm, more preferably 0.5 μm to 50 μm, and particularly preferably 1 μm to 20 μm.

The strength of the hardcoat layer is preferably H or higher, more preferably 2H or higher, and most preferably 3H or higher in a pencil hardness test in accordance with JIS K5400. Further, in a Taber test in accordance with JIS K5400, it is preferred that the abrasion amount of test pieces before an after the test is as low as possible.

As a material forming the hardcoat layer, an ethylenically unsaturated group containing compound or a ring-opening polymerizable group containing compound may be used either alone or in combination.

Preferred examples of the ethylenically unsaturated group containing compound include polyacrylates of polyol such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate; epoxy acrylates such as diacrylate of bisphenol A diglycidyl ether and diacrylate of hexanediol diglycidyl ether; urethane acrylate obtained by a reaction of polyisocyanate and hydroxyl group containing acrylate such as hydroxyethyl acrylate, and the like as preferred compounds.

Further, examples of commercially available products of the ethylenically unsaturated group containing compound include EB-600, EB-40, EB-140, EB-1150, EB-1290K, IRR214, EB-2220, TMPTA and TMPTMA (all manufactured by Daicel-UCB Co. Ltd.), UV-6300 and UV-1700B (all manufactured by The Nippon Synthetic Chemical Industry Co., Ltd.), and the like.

Further, preferred examples of the ring-opening polymerizable group containing compound include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocianurate, sorbitol tetraglycidyl ether, pentaerythritol tetraglycidyl ether, polyglycidyl ether of cresol novolac resin and polyglycidyl ether of phenol novolac resin; alicyclic epoxys such as CELLOXIDE 2021P, CELLOXIDE 2081, EPOLEAD GT-301, EPOLEAD GT-401 and EHPE3150CE (all manufactured by Daicel Chemical Industries, Ltd.), polycyclohexylepoxymethyl ether of phenol novolac resin; oxetanes such as OXT-121, OXT-221, OX-SQ and PNOX-1009 (all manufactured by TOAGOSEI CO., LTD.), and the like. Besides, a polymer of glycidyl(meth)acrylate, or a copolymer with a monomer polymerizable with glycidyl(meth)acrylate may be used in the hardcoat layer.

In order to reduce the cure shrinkage of the hardcoat layer, to enhance the adhesion with the substrate, impart a light scattering property, and to reduce curl of the hardcoat-treated articles of the present invention, it is also preferred to add oxide fine particles of silicon, titanium, zirconium, aluminum and the like; or crosslinked fine particles such as organic fine particles, for example, crosslinked particles of polyethylene, polystyrene, poly(meth)acrylic esters, polydimethylsiloxane and the like, and crosslinked rubber fine particles to the hardcoat. The average diameter of the crosslinked fine particles is preferably 1 nm to 20,000 nm. Further, as the shape of the fine crosslinked particles, a spherical shape, a rod shape, a needle shape, a plate shape and the like may be used without any specific limitation. The amount of the fine, particles added is preferably 60% by volume or less of the hardcoat layer after cured, and more preferably 40% by volume or less.

In the case of adding the inorganic fine particles as describe above, as the affinity with binder polymers is generally poor, it is preferred to perform a surface treatment with a surface treatment agent containing a metal such as silicon, aluminum and titanium, and having a functional group such as an alkoxide group, a carboxylate group, a sulfonate group and a phosphonate group.

The hardcoat layer is preferably formed by a crosslinking reaction by light and/or heat, or a polymerization reaction. A curable functional group is preferably a photopolymerizable functional group.

Furthermore, a hydrolyzable functional group containing organic metal compound may be used. The hydrolysable functional group containing organic metal compound is preferably an organic alkoxysilyl compound.

Besides, a polymerization intiator and a leveling agent, which are well known, may be added to the hardcoat layer.

As a specific constitutional composition of the hardcoat layer, it is preferred to use those as described, for example, in Japanese Patent Application Laid-Open Nos. 2002-144913 and 2000-9908, and WO0/46617.

(2) Antireflection Layer

In the protective film for polarizing plate of the present invention, an antireflection layer may be formed as an active energy ray-cured layer on the cellulose acylate film.

As an antireflection layer, it is possible to use any of a layer having a reflectivity of 1.5% in which a low refractive index material such as a fluorine-based polymer is simply given as a single layer, or a layer having a reflectivity of 1% or less which uses a multilayer interference of a thin film. The present invention preferably has a configuration in which a low refractive index layer is laminated on a transparent support, and at least one layer having a higher refractive index than that of the low refractive index layer (that is, a high refractive index layer or a medium refractive index layer) is laminated thereon. Further, it is also preferred to use an antireflection layer as described in Nitto Technical Report, vol. 38, No. 1, May 2000, pp 26-28, or Japanese Patent Application Laid-Open No. 2002-301783.

The refractive indices in each layer satisfy the following relationship.

Refractive index of the high refractive index layer>Refractive index of the medium refractive index>Refractive index of the transparent support>Refractive index of the low refractive index The transparent support used in the antireflection film may be a transparent polymer film used in the protective film for the polarizer as described above.

The refractive index of the low refractive index layer is 1.20 to 1.55, and preferably 1.30 to 1.50. The low refractive index layer is preferably used as the outermost layer having a scratch resistance and an antifouling property. In order to enhance the scratch resistance, it is preferred to impart a slipping property to the surface by using a material containing a silicon group or fluorine.

Examples of the fluorine-containing compound include compounds as described, for example, in Paragraphs [0018] to [0026] of Japanese Patent Application Laid-Open No. H9-222503, Paragraphs [0019] to [0030] of Japanese Patent Application Laid-Open No. H11-40284, Paragraphs [0027] to [0028] of Japanese Patent Application Laid-Open No. 2001-40284, Japanese Patent Application Laid-Open No. 2000-284102 and the like.

The silicon-containing compound is preferably a compound having a polysiloxane structure, but a reactive silicone (for example, Silaplane, manufactured by Chisso Corporation) or a polysiloxane containing silanol groups at both ends (Japanese Patent Application Laid-Open No. H11-258403) may be used as well. An organic metal compound such as a silane coupling agent and a silane coupling agent containing a specific fluorine-containing hydrocarbon may be cured by a condensation reaction at the presence of a catalyst (compounds as described in Japanese Patent Application Laid-Open Nos. S58-142958, S58-147483, S58-147484, H9-157582, H11-106704, 2000-117902, 2001-48590, 2002-53804 and the like).

The low refractive index layer may contain, as other additives, a low refractive index inorganic compound having an average primary particle diameter of 1 nm to 150 nm such as a filler (for example, silicon dioxide (silica), fluorine-containing particles (magnesium fluoride, calcium fluoride and barium fluoride), an organic fine particles as described in Paragraphs [0020] to [0038] of Japanese Patent Application Laid-Open No. H11-3820, a silane coupling agent, a slipping agent, a surfactant and the like.

The low refractive index layer may be formed by a vapor deposition method (a vacuum vapor deposition method, a sputtering method, an ion plating method, a plasma CVD method, and the like), but is preferably formed by a coating method from the viewpoint of cheap production cost. Examples of the coating method include a dip coating method, an air knife coating method, a curtain coating method, a roller coating method, a wire bar coating method, a gravure coating method and a microgravure coating method.

The film thickness of the low refractive index layer is preferably 30 nm to 200 nm, more preferably 50 nm to 150 nm, and most preferably 60 nm to 120 nm.

The medium refractive index layer and the high refractive index layer preferably have a configuration in which high refractive index inorganic compound ultrafine particles having an average diameter of not more than 100 nm are dispersed in a material for a matrix. The high refractive index inorganic compound ultrafine particles are preferably inorganic compounds having a refractive index of 1.65 or higher, for example, oxides of Ti, Zn, Sb, Sn, Zr, Ce, Ta, La, In and the like, composite oxides containing the metal atoms and the like.

Such ultrafine particles may be used as an aspect in which the particle surfaces are treated with a surface treatment agent (a silane coupling agent and the like: Japanese Patent Application Laid-Open Nos. H11-295503, H11-153703 and 2000-9908, and an anionic compound or an organic metal coupling agent: Japanese patent Application Laid-Open No. 2001-166104 and the like), an aspect having a core-shell structure containing high refractive index particles as a core (Japanese Patent Application Laid-Open No. 2001-166104 and the like), an aspect using a specific dispersant in combination (for example, Japanese Patent Application Laid-Open No. H11-153703, U.S. Pat. No. 6,210,858 B1, Japanese Patent Application Laid-Open No. 2002-2776069 and the like) and the like.

As the material for a matrix, it is possible to use previously known thermoplastic resins, curable resin coatings and the like. It is also possible to use multifunctional materials as described in Japanese Patent Application Laid-Open Nos. 2000-47004, 2001-315242, 2001-31871, 2001-296401 and the like, or a curable film obtained from a metal alkoxide composition as described in Japanese Patent Application Laid-Open 2001-293818.

The refractive index of the high refractive index layer is preferably 1.70 to 2.20. The thickness of the high refractive index layer is preferably 5 nm to 10 and more preferably 10 nm to 1 μm.

The refractive index of the medium refractive index layer is adjusted to be a value between the refractive index of the low refractive index layer and the refractive index of the high refractive index layer. The refractive index of the medium refractive index layer is preferably 1.50 to 1.70.

The haze of the antireflection layer is preferably 5% or less, and more preferably 3% or less. Further, the strength of the film is preferably H or higher, more preferably 2H or higher, and most preferably 3H or higher in the pencil hardness test in accordance with JIS K5400.

(3) Forward Scattering Layer

In the protective film for polarizing plate of the present invention, a forward scattering layer may be formed as an active energy ray-cured layer on the surface of the cellulose acylate film.

The forward scattering layer is used to modify the viewing characteristics (hue and luminance distribution) in the upper and lower, and left and right directions when the polarizing plate of the present invention is applied to a liquid crystal display device. The present invention preferably has a configuration in which fine particles having different refractive indices are dispersed in a binder. For example, it is possible to use the configuration of Japanese Patent Application Laid-Open No. H11-38208 in which the front scattering coefficient is specified, the configuration of Japanese Patent Application Laid-Open No. 2000-199809 in which the relative refractive indices of a transparent resin and fine particles are set within a specific range, the configuration of Japanese Patent Application Laid-Open No. 2002-107512 in which the haze value is defined as 40% or higher, and the like. Further, in order to control the viewing angle characteristics of the haze, it is also preferred to use the polarizing plate of the present invention in combination with "LUMISTY" as described in Technical Report, "Photofunctional film", pp 31-39, Sumitomo Chemical Co., Ltd.

(4) Anti-Glare Layer

In the protective film for polarizing plate of the present invention, an anti-glare layer may be formed as an active energy ray-cured layer on the surface of the cellulose acylate film.

The anti-glare layer is used to scatter reflected light, thereby suppressing the light from being reflected back. The anti-glare function is obtained by forming unevenness on the outermost surface (display side) of a liquid crystal display device. The haze of the film having the anti-glare function is preferably 3 to 30%, more preferably 5 to 20%, and most preferably 7 to 20%.

The method for forming unevenness on the surface of the film includes, for example, a method for forming unevenness on the surface of a film by adding fine particles thereto (for example, Japanese Patent Application Laid-Open No. 2000-271878 and the like), a method for forming a surface unevenness film by adding relatively large particles (a diameter of 0.05 μm to 2 μm) in a small amount (0.1% by mass to 50% by mass) (for example, Japanese Patent Application Laid-Open Nos. 2000-281410, 2000-95893, 2001-100004, 2001-281407 and the like), a method for physically transferring unevenness into the surface of a film (for example, as described as an embossing process in Japanese Patent Application Laid-Open Nos. 563-278839, H11-183710, 2000-275401 and the like), and the like.

<2-3: Method for Forming Active Energy Ray-Cured Layer>

A method for forming the active energy ray-cured layer is not particularly limited, and any known methods may be used. Among them, it is preferred to form active energy ray-cured layer by dissolving a material for forming the active energy ray-cured layer in an organic solvent, and then applying the solution onto the cellulose acylate film.

As the organic solvent, any known solvents may be used either alone or in a mixture of two or more thereof. Among them, it is preferred in the present invention to use a ketone-based solvent, an acetic ester-based solvent or a hydrocarbon-based solvent.

A specific method for applying the active energy ray-cured layer is not particularly limited, but a microgravure application method may preferably be used. Further, a conveying speed during the application is not particularly limited, and the application is preferably performed at a conveying speed of 1 m/min to 100 m/min. Drying after the application is not particularly limited as well, and drying is preferably performed at a drying temperature of 25° C. to 140° C. for 30 seconds to 1000 seconds.

For the active energy ray-cured layer, it is more preferred to use an active energy ray such as radiation, a gamma-ray, an alpha-ray, an electron beam, an ultraviolet ray and the like among active energy rays, and it is particularly preferred to use an electron beam or an ultraviolet ray in consideration of safety and productivity. In the case of curing by heat, the heating temperature is 140° C. or lower, and more preferably 100° C. or lower in consideration of the heat resistance of the plastic itself.

When irradiated with an active energy ray, it is preferred to perform the irradiation with nitrogen purging (an oxygen concentration of 0.5% or less). There is no particular limitation on the intensity of the active energy ray and the like, but, for example, when irradiated with an ultraviolet ray, it is preferred to irradiate with an ultraviolet ray at an illuminance of 10 mW/cm$^2$ to 1000 mW/cm$^2$ and an irradiation dose of 50 mJ/cm$^2$ to 500 mJ/cm$^2$.

[Polarizing Plate]

Further, the present invention relates to a polarizing plate characterized by using at least one protective film for polarizing plate of the present invention.

The polarizing plate preferably includes a polarizer and the protective film for polarizing plate of the present invention on one side of the polarizer. Herein, the protective film for polarizing plate and the polarizer are preferably bonded to each other such that the polarizer side is disposed on the opposite side to the active energy ray-cured layer bearing side with respect to the cellulose acylate film of the protective film for polarizing plate of the present invention. An aspect of the polarizing plate of the present invention includes a polarizing plate in an aspect of a film piece that is cut to a size capable of being incorporated as it is into a liquid crystal display device, as well as a polarizing plate in an aspect of a wound plate that is manufactured in a long shape by continuous production and wound in a roll shape (for example, an aspect of a roll of 2,500 m or more, or 3,900 m or more in length. For use in large screen liquid crystal display devices, the width of the polarizing plate is preferably 1,470 mm or more as described above.

There is no particular limitation on the specific configuration of the polarizing plate of the present invention, and it is possible to adopt any known configurations, for example, the configuration as described in FIG. 6 of Japanese Patent Application Laid-Open No. 2008-262161.

(Change in Cross Transmittance)

In the present specification, the cross transmittance (CT) was measured using UV3100PC (manufactured by Shimadzu Corporation). The measurement was performed at 410 nm, and the average value of ten measurements was used.

The durability test of the polarizing plate may be performed in a state where the polarizing plate is adhered through an adhesive to a glass as follows. Two samples (about 5 cm×5 cm) are prepared, in which a polarizing plate are adhered onto a glass. In the single plate cross transmittance measurement, the film side of the sample is set to be towards the light source, and the measurement is performed. Two samples are measured separately, and the average value is taken as a cross transmittance of the polarizing plate of the present invention.

The polarizing plate of the present invention preferably has an amount of change (%) in single plate cross transmittance of 1.40% or less when left standing at 60° C. and 95% RH for 1000 hours.

Preferably, the amount of change (%) in single plate cross transmittance is more preferable 1.00% or less, and particularly preferably 0.50% or less when left standing at 60° C. and 95% RH for 1000 hours. Herein, the amount of change refers to a value obtained by subtracting a measurement value before the test from a measurement value after the test.

If the above range of the amount of change in cross transmittance is satisfied, it is possible to secure the stability of the polarizing plate during its use or in storage for a long period of time under high temperature and high humidity conditions.

[Liquid Crystal Display Device]

The present invention also relates to a liquid crystal display device including the protective film for polarizing plate of the present invention or the polarizing plate of the present invention.

The liquid crystal display device of the present invention is preferably a liquid crystal display device in an IPS mode, an OCB mode or a VA mode including a liquid crystal cell and a pair of polarizing plates disposed at both sides of the liquid crystal cell, wherein at least one of the polarizing plates is the polarizing plate of the present invention.

As a specific configuration of the liquid crystal display device of the present invention, there is no specific limitation thereon, and any known configurations may be adopted. For example, as illustrated in FIG. 1, polarizing plates may be installed on both sides of a liquid crystal cell 13, and the cellulose acylate film of the present invention may be used as protective films 14 and 15 on the liquid crystal cell 13 side of polarizers 11 and 12.

Further, the configuration as described in FIG. 2 of Japanese Patent Application Laid-Open No. 2008-262161 may also be preferably adopted.

EXAMPLES

Hereinafter, the present invention will be described in more detail with reference to Examples. The materials, reagents, amounts and ratios of substances, operations, and the like explained in Examples below may appropriately be modified without departing from the spirit of the present invention. Therefore, the scope of the present invention is not limited to the specific examples described below.

Example 101

(1) Formation of Cellulose Acylate Film

<Preparation of Cellulose Acylate>

Cellulose acylate having a degree of acetyl substitution of 2.88 was prepared. Sulfuric acid (7.8 parts by mass based on 100 parts by mass of cellulose) as a catalyst, and carboxylic acid as a raw material of acyl substituents were added to perform an acylation at 40° C. Further, after the acylation, the mixture was aged at 40° C. Then, the low molecular weight content of the cellulose acylated was removed by washing with acetone.

(Preparation of Cellulose Acylate Solution 1)

The following composition was introduced into a mixing tank and stirred to dissolve each component, thereby preparing cellulose acylate solution 1.

Composition of Cellulose Acylate Solution 1

| | |
|---|---|
| Cellulose acylate having a degree of acetyl substitution of 2.88 and a degree of polymerization of 370 | 100.0 parts by mass |

| | |
|---|---|
| Additive 1 (L-1: as shown above) | 6.5 parts by mass |
| Additive 2 (M-1: as shown above) | 4.0 parts by mass |
| UV absorbent C | 1.5 parts by mass |
| Methylene chloride (first solvent) | 412.2 parts by mass |
| Ethanol (second solvent) | 35.8 parts by mass |

UV absorbent C

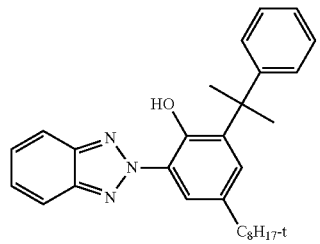

(Preparation of Matting Agent Solution 2)

The following composition was introduced into a disperser and stirred to dissolve each component, thereby preparing matting agent solution 2.

Composition of Matting Agent Solution 2

| | |
|---|---|
| Silica particles having an average particle size of 20 nm (AEROSIL R972, manufactured by Nippon Aerosil Co., Ltd.) | 2.0 parts by mass |
| Methylene chloride (first solvent) | 79.9 parts by mass |
| Ethanol (second solvent) | 6.9 parts by mass |
| The above-described cellulose acylate solution 1 | 0.9 parts by mass |

(Preparation of Hindered Amine-Based Compound Solution 3)

The following composition was introduced into a mixing tank and stirred while heating to dissolve each component, thereby preparing hindered amine-based compound solution 3.

Composition of Hindered-Amine-Based Compound Solution 3

| | |
|---|---|
| Antioxidant (CHIMASSORB 944FDL, manufactured by BASF) | 10.0 parts by mass |
| Methylene chloride (first solvent) | 71.0 parts by mass |
| Ethanol (second solvent) | 6.2 parts by mass |
| The above-described cellulose acylate solution 1 | 12.8 parts by mass |

<Casting>

1.3 parts by mass of matting agent solution 2 and 0.1 parts by mass of hindered amine-based compound solution 3 was filtered separately, and then mixed using an in-line mixer. In addition, 98.6 parts by mass of cellulose acylate solution 1 was added and mixed using an in-line mixer. The dope as prepared above was cast onto a stainless steel casting support (the support temperature of 22° C.) using a band casting machine. The film produced was peeled off in a state where the residual solvent amount was about 20% by mass in the dope, gripped by a tenter at both ends in the film width direction, and dried while stretching 1.10 times (10%) in the width direction at a temperature of 120° C. in a state where the residual solvent amount was 5% by mass to 10% by mass. Subsequently, the film was further dried by conveying between rolls of the heat treatment machine to obtain the cellulose acylate film of Example 101. The thickness of the cellulose acylate film obtained was 60 μm, and the width was 1480 mm.

The surface hardness, the degree of alignment in the thickness direction of the cellulose acylate film and the crystallization amount of the cellulose acylate film obtained were measured as follows.

<Measurement of Surface Hardness of Cellulose Acylate Film>

The surface of a sample fixed on a glass substrate was measured using FISCHERSCOPE H100Vp type hardness tester manufactured by Fischer Instruments K.K under conditions including a loading time of 10 sec, a creep time of 5 sec, an unloading time of 10 sec and maximum load of 50 mN by a Knoop indentor in which the minor axis direction of the indentor is disposed in parallel to the conveying direction (longitudinal direction: test direction in the pencil hardness test) when forming the cellulose acylate film. The surface hardness was calculated from the relationship between the maximum load and the contact area between the indentor and the sample obtained from the indentation depth, and an average value of these five points are defined as the surface hardness.

Also, the surface of a sample fixed on a glass substrate was measured, in accordance with the method of JIS X 2251, using FISCHERSCOPE H100Vp type hardness tester manufactured by Fischer Instruments K.K under conditions including a loading time of 10 sec, a creep time of 5 sec, an unloading time of 10 sec and maximum load of 50 mN, and thus the hardness was calculated from the relationship between the maximum load and the contact area between the indentor and the sample obtained from the indentation depth, and an average value of these five points are defined as the surface hardness. Here, JIS Z 2251 is a Japanese Industrial Standards, which is defined based on ISO4545. Further, measurements for Knoop hardness were carried out in 18 directions when rotating the Knoop indenter by 10° from 0° to 180°, the each measurement is carried out at the same press position, and accordingly the minimum value of Knoop hardness was obtained. The minimum value corresponds to the surface hardness obtained in the conditions where the minor axis direction of the Knoop indentor is disposed in parallel to the conveying direction (longitudinal direction: test direction in the pencil hardness test) when forming the cellulose acylate film <Measurement of Degree of Alignment in Thickness Direction of Cellulose Acylate Film>

X-rays were generated at 50 kV to 100 mA using a Cu tube as an X-ray source by RAPID R-AXIS manufactured by Rigaku Corporation. The collimator was 0.8 mmΦ, and the film sample was fixed using a transmissive sample holder. Further, the exposure time was 180 seconds. The degree of alignment in the thickness direction of the cellulose acylate film was determined by dividing the cross-section in parallel to the conveying direction and the thickness direction of the film into five portions from the support side when forming the cellulose acylate film to the air interface side, measuring the degrees of alignment of the cross-section of the film at each portion using X-ray beams of several μm to dozens of and calculating the average of the five portions.

<Measurement of Crystallization Amount in Cellulose Acylate Film>

Using a differential scanning calorimetry (DSC) machine (DSC 8230, manufactured by Rigaku Corporation), 5 mg to 6 mg of the cellulose acylate film was placed in an aluminum measuring pan (Cat. No. 8578, manufactured by Rigaku Corporation) of the DSC, heated from 25° C. to 120° C. at a rate of 20° C./min, kept at the temperature for 15 minutes, and then cooled up to 30° C. at a rate of −20° C./min. Thereafter, by defining Mc as an area of the exothermic peak appeared when heating again from 30° C. to 320° C. at a rate of 20° C./min, and ΔHm as an area of the endothermic peak, ΔHm-ΔHc was calculated to obtain the crystallization amount (ΔHm-ΔHc) in the cellulose acylate film.

(2) Formation of Active Energy Ray-Cured Layer

<Preparation of Coating Liquid for Hardcoat Layer (HC-1)>

Each component was prepared in the following composition, followed by filtration by a polypropylene filter having a bore of 30 μm to prepare the coating liquid for a hardcoat layer (HC-1).

Composition of Coating Liquid for Hardcoat Layer (HC-1)

| | |
|---|---|
| UV-1700B (binder, manufactured by The Nippon Synthetic Chemical Industry Co., Ltd.) | 37.8 parts by mass |
| Ethanol (solvent) | 61.4 parts by mass |
| Irgacure 184 (polymerization initiator, manufactured by Ciba Specialty Chemicals Inc.) | 1.2 parts by mass |

<Formation of Hardcoat Layer>

The coating liquid for a hardcoat layer (HC-1) was coated onto the surface in contact with the support when forming the cellulose acylate film as formed above in a microgravure coating manner at a conveying speed of 30 m/min. After drying at 60° C. for 150 seconds, the coated layer was cured by irradiating an ultraviolet thereon at an illuminance of 400 mW/cm² and an irradiation dose of 150 mJ/cm² by using an air cooled metal halide lamp (manufactured by Eye Graphics Co., Ltd.) of 160 W/cm under nitrogen purge (an oxygen concentration of 0.5% or less) to form a hardcoat layer.

The protective film for polarizing plate having the obtained hardcoat layer was regarded as the protective film for polarizing plate of Example 101.

(3) Manufacture of Polarizing Plate

[Saponification of Polarizing Protective Film]

The polarizing protective film of Example 101 thus manufactured was immersed in a 2.3 mol/L aqueous sodium hydroxide solution at 55° C. for 3 minutes. The film was washed with water in a washing bath at room temperature and neutralized with 0.05 mol/L sulfuric acid at 30° C., followed by washing again with water in the washing bath at room temperature and drying with warm air at 100° C. Accordingly, the surface of the polarizing protective film of Example 101 was saponified.

[Manufacture of Polarizing Plate]

A polarizer was manufactured by adsorbing iodine onto a stretched polyvinyl alcohol film.

The saponified polarizing protective film of Example 101 was attached to one side of the polarizer using a polyvinyl alcohol-based adhesive. Here, the surface of a side not forming a hardcoat layer of the polarizing protective film was bonded. A commercially available cellulose triacetate film (FUJITAC TD80UF, manufactured by Fuji Photo Film Co., Ltd) was saponified in the same manner, and the cellulose triacetate film after the saponification treatment was attached using the polyvinyl alcohol-based adhesive to the polarizer surface of a side opposite where the polarizing protective film of Example 101 thus manufactured was attached.

At this time, a transmission axis of the polarizer and a slow axis of the polarizing protective film of Example 101 were disposed orthogonal to each other. Further, the transmission axis of the polarizer and a slow axis of the commercially available cellulose triacetate film were disposed orthogonal to each other as well.

The polarizing plate of Example 101 was manufactured in this manner.

Examples 102 to 125 and Comparative Examples 201 to 207

Manufacture of Polarizing Protective Films of Examples 102 to 125 and Comparative Examples 201 to 207

Cellulose acylate films and polarizing protective films of Examples 102 to 125 and Comparative Examples 201 to 207 were manufactured in the same manner as in Example 101, except that kinds and amounts of additives 1, 2 and antioxidant, peel-off volatile matter, stretching ratio and thickness were changed as described in Table 4. That is, the polarizing protective films of Examples 102 to 125 and Comparative Examples 201 to 207 has an active energy ray-cured layer formed in the same manner as in Example 101.

Meanwhile, in Table 4 below, amounts of additives 1, 2 and antioxidant are shown in parts by mass based on 100 parts by mass of cellulose acylate. Further, in Table 4 below, CHIMASSORB 944FDL, CHIMASSORB 2020FDL, TINUVINI 123, TINUVINI 152, FLAMESTAB NOR 116FF were manufactured by BASF Corporation. In addition, additive D and additive E have the following structure, respectively.

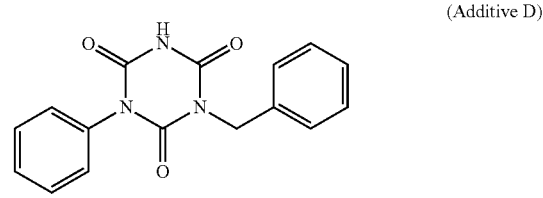

(Additive D)

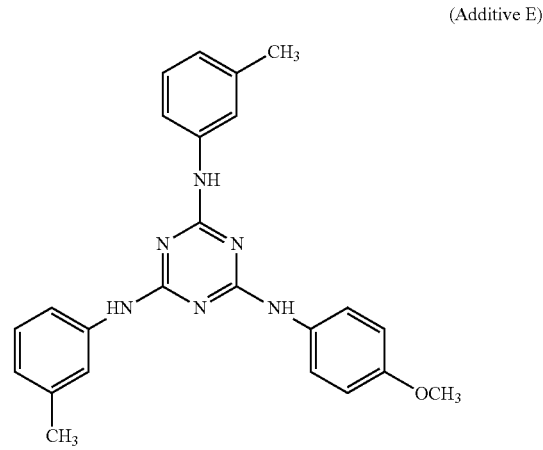

(Additive E)

TABLE 4

| | Additive 1 | | Additive 2 | | Antioxidant | | Peel-off volatile matter % | Stretching ratio | | Thickness |
| | Kind | Amount[a] | Kind | Amount[a] | Kind | Amount[a] | | Conveying direction | Thickness direction | |
|---|---|---|---|---|---|---|---|---|---|---|
| Ex. 101 | Additive L-1 | 6.5 | Additive M-1 | 4 | CHIMASSORB 944FDL | 0.1 | 20 | 0 | 10 | 60 |
| Ex. 102 | Additive L-1 | 6.5 | Additive M-1 | 4 | CHIMASSORB 944FDL | 0.25 | 20 | 0 | 10 | 60 |
| Ex. 103 | Additive L-1 | 6.5 | Additive M-1 | 4 | CHIMASSORB 944FDL | 0.5 | 20 | 0 | 10 | 60 |
| Ex. 104 | Additive L-1 | 6.5 | Additive M-1 | 4 | CHIMASSORB 944FDL | 1 | 20 | 0 | 10 | 60 |
| Ex. 105 | Additive L-1 | 6.5 | Additive M-1 | 4 | CHIMASSORB 944FDL | 1.9 | 20 | 0 | 10 | 60 |
| Ex. 106 | Additive L-1 | 6.5 | Additive M-1 | 4 | CHIMASSORB 944FDL | 5 | 20 | 0 | 10 | 60 |
| Ex. 107 | Additive L-1 | 6.5 | Additive M-1 | 4 | CHIMASSORB 2020FDL | 0.5 | 20 | 0 | 10 | 60 |
| Ex. 108 | Additive L-0 | 6.5 | Additive M-1 | 4 | CHIMASSORB 2020FDL | 0.5 | 20 | 0 | 10 | 60 |
| Ex. 109 | Additive L-2 | 6.5 | Additive M-1 | 4 | CHIMASSORB 2020FDL | 0.5 | 20 | 0 | 10 | 60 |
| Ex. 110 | Additive L-3 | 6.5 | Additive M-1 | 4 | CHIMASSORB 2020FDL | 0.5 | 20 | 0 | 10 | 60 |
| Ex. 111 | Additive L-4 | 6.5 | Additive M-1 | 4 | CHIMASSORB 2020FDL | 0.5 | 20 | 0 | 10 | 60 |
| Ex. 112 | Additive L-1 | 6 | — | 0 | CHIMASSORB 944FDL | 0.5 | 20 | 0 | 10 | 60 |
| Ex. 113 | Additive N-1 | 16 | — | 0 | CHIMASSORB 944FDL | 0.5 | 20 | 0 | 10 | 60 |
| Ex. 114 | Additive N-1 | 22 | — | 0 | CHIMASSORB 944FDL | 0.5 | 20 | 0 | 10 | 60 |
| Ex. 115 | Additive L-1 | 10 | — | 0 | CHIMASSORB 944FDL | 0.5 | 20 | 0 | 10 | 60 |
| Ex. 116 | Additive L-1 | 10 | — | 0 | CHIMASSORB 944FDL | 0.5 | 20 | 5 | 15 | 60 |
| Ex. 117 | Additive L-1 | 10 | — | 0 | CHIMASSORB 944FDL | 0.5 | 20 | 10 | 30 | 60 |
| Ex. 118 | Additive L-1 | 10 | — | 0 | CHIMASSORB 944FDL | 0.5 | 35 | 0 | 10 | 60 |
| Ex. 119 | Additive L-1 | 10 | — | 0 | CHIMASSORB 944FDL | 0.5 | 50 | 0 | 10 | 60 |
| Ex. 120 | Additive L-1 | 10 | — | 0 | TINUVIN 123 | 0.5 | 20 | 0 | 10 | 60 |
| Ex. 121 | Additive L-1 | 10 | — | 0 | TINUVIN 152 | 0.5 | 20 | 0 | 10 | 60 |
| Ex. 122 | Additive L-1 | 10 | — | 0 | FLAMESTAB NOR 116FF | 0.5 | 20 | 0 | 10 | 60 |
| Ex. 123 | Additive 7 | 6 | — | 0 | CHIMASSORB 944FDL | 0.5 | 20 | 0 | 10 | 60 |
| Ex. 124 | Additive 15 | 6 | — | 0 | CHIMASSORB 944FDL | 0.5 | 20 | 0 | 10 | 60 |
| Ex. 125 | Additive 25 | 6 | — | 0 | CHIMASSORB 944FDL | 0.5 | 20 | 0 | 10 | 60 |
| C. Ex. 201 | None | 0 | None | 0 | None | 0 | 20 | 0 | 10 | 60 |
| C. Ex. 202 | None | 0 | None | 0 | CHIMASSORB 944FDL | 0.5 | 20 | 0 | 10 | 60 |
| C. Ex. 203 | triphenyl phosphate | 8 | biphenyl diphenyl phosphate | 4 | None | 0 | 20 | 0 | 10 | 60 |
| C. Ex. 204 | triphenyl phosphate | 8 | biphenyl diphenyl phosphate | 4 | CHIMASSORB 944FDL | 0.1 | 20 | 0 | 10 | 60 |
| C. Ex. 205 | Additive D | 11 | Additive E | 11 | CHIMASSORB 944FDL | 0.5 | 20 | 0 | 10 | 60 |
| C. Ex. 206 | Additive L-1 | 6.5 | Additive B-1 | 4 | None | 0 | 20 | 0 | 10 | 60 |
| C. Ex. 207 | Additive L-1 | 6.5 | Additive B-1 | 4 | CHIMASSORB 944FDL | 6 | 20 | 0 | 10 | 60 |

[a]represents parts by mass based on 100 parts by mass of cellulose acylate

[Saponification of Polarizing Protective Film and Manufacture of Polarizing Plate]

The protective film for polarizing plates of Examples 102 to 125 and the protective film for polarizing plates of Comparative Examples 201 to 207 were saponified and used in manufacturing a polarizing plate, respectively, in the same manner as in Example 101, thereby manufacturing polarizing plates of the corresponding Examples and Comparative Examples.

[Evaluation]

<Evaluation of Adhesion>

First, the polarizing protective films having a hardcoat layer of Examples and Comparative Examples thus manufactured were irradiated with light under the environment of 60° C. and 50% RH using a super xenon weather meter SX75 manufactured by Suga Test Instruments Co., Ltd.

Subsequently, the polarizing protective film having a hardcoat layer was humidity-controlled under the condition of 25° C. and 60% RH for 2 hours. Eleven horizontal lines and eleven vertical lines of cuts were made in a check shape using a cutter knife on the surface of a side having a hardcoat layer, so as to have a total of 100 square lattices, and polyester adhesive tape (No. 31B) manufactured by Nitto Denko Corporation was attached to the surface. After 30 minutes, the tape was rapidly peeled off in a vertical direction, and the number of peeled lattices was counted for evaluation based on four criteria below. The same adhesion evaluation tests were performed three times to obtain an average.

A: No peeling was identified on 100 lattices.
B: Peeling was identified on one or two of 100 lattices.
C: Peeling was identified on three to ten of 100 lattices (within an allowable range).
D: Peeling was identified on 11 or more of 100 lattices.

The results obtained are shown in Table 5 below.

<Evaluation of Pencil Hardness>

A pencil hardness evaluation as described in JIS K 5400 was performed. The polarizing protective film was humidity-controlled under the condition of 25° C. and 60% RH for 2 hours. The evaluation was performed using 2H and 3H grade test pencils specified in JIS S 6006, and with a load of 500 g. The criteria are as follows.

OK: No scratch was identified in the evaluation of n=5.
NG: Two or more scratches were identified in the evaluation of n=5.

Meanwhile, the test direction of the pencil (scratching direction) was in parallel to the conveying direction (longitudinal direction) when forming a cellulose acylate film.

The results obtained are shown in Table 5 below.

TABLE 5

| | Crystallization amount | Degree of alignment in the thickness | Surface hardness | Pencil hardness | | Adhesion |
|---|---|---|---|---|---|---|
| | J/g | direction | N/mm² | 2H | 3H | |
| Example 101 | 12.2 | 0.110 | 182 | OK | OK | B |
| Example 102 | 12.3 | 0.110 | 182 | OK | OK | B |
| Example 103 | 12.1 | 0.110 | 182 | OK | OK | B |
| Example 104 | 12.2 | 0.110 | 182 | OK | OK | B |
| Example 105 | 12.1 | 0.110 | 178 | OK | OK | B |
| Example 106 | 12.3 | 0.110 | 172 | OK | NG | B |
| Example 107 | 12.2 | 0.110 | 182 | OK | OK | B |
| Example 108 | 12.3 | 0.111 | 176 | OK | OK | B |
| Example 109 | 12.2 | 0.110 | 182 | OK | OK | B |
| Example 110 | 12.2 | 0.109 | 183 | OK | OK | B |
| Example 111 | 12.1 | 0.110 | 180 | OK | OK | B |
| Example 112 | 13 | 0.120 | 171 | OK | NG | A |
| Example 113 | 11.8 | 0.110 | 191 | OK | OK | B |
| Example 114 | 11.5 | 0.100 | 202 | OK | OK | C |
| Example 115 | 12 | 0.110 | 177 | OK | NG | B |
| Example 116 | 12.3 | 0.120 | 182 | OK | OK | B |
| Example 117 | 12.6 | 0.140 | 193 | OK | OK | C |
| Example 118 | 13.3 | 0.120 | 181 | OK | OK | A |
| Example 119 | 14.5 | 0.120 | 187 | OK | OK | A |
| Example 120 | 13.3 | 0.121 | 181 | OK | OK | B |
| Example 121 | 13.2 | 0.120 | 180 | OK | OK | B |
| Example 122 | 13.2 | 0.119 | 180 | OK | OK | B |
| Example 123 | 13 | 0.120 | 183 | OK | OK | A |
| Example 124 | 13 | 0.120 | 182 | OK | OK | A |
| Example 125 | 13 | 0.120 | 184 | OK | OK | A |
| Comparative Example 201 | 12.7 | 0.100 | 159 | NG | NG | B |
| Comparative Example 202 | 12.6 | 0.100 | 158 | NG | NG | A |
| Comparative Example 203 | 13.2 | 0.090 | 158 | NG | NG | D |
| Comparative Example 204 | 13.1 | 0.090 | 158 | NG | NG | C |
| Comparative Example 205 | 11.6 | 0.100 | 225 | OK | OK | D |
| Comparative Example 206 | 12.3 | 0.110 | 181 | OK | OK | D |
| Comparative Example 207 | 11.5 | 0.109 | 163 | NG | NG | B |

From the results of Table 5 above, it can be understood that peeling between a hardcoat layer and a cellulose acylate film hardly occurs for the polarizing plate using the polarizing protective film of the present invention even when irradiated with light for a long period of time, and a scratch resistance (pencil hardness) of a surface is excellent as well.

Example 301

Manufacture of Liquid Crystal Display Device

A viewer side polarizing plate of a commercially available liquid crystal display television (BRAVIA J5000 manufactured by Sony Corporation) was peeled off, and the polarizing plate of the present invention using the polarizing protective film of Example 101 was attached via an adhesive such that the polarizing protective film of Example 101 was disposed on a liquid crystal cell side. The transmission axis of the viewer side polarizing plate was disposed in an up and down direction.

Further, a liquid crystal display device was manufactured in the same manner except that the polarizing protective films of Examples 102 to 125 and Comparative Examples 201 to 207 were used instead of the polarizing protective film of Example 101.

In the liquid crystal display device of Examples 102 to 125 in the present invention thus manufactured, a scratch hardly occurs on the surface of the display device, compared with a liquid crystal display device using a polarizing protective film in each of Comparative Examples, and display performance hardly deteriorates even when used under the environment of direct sunlight for a long period of time.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cellulose acylate film, comprising a hindered amin-based compound,
    wherein the hindered amine-based compound is contained in an amount of 0.001% by mass to 5% by mass based on cellulose acylate,
    a minimum value of Knoop hardness is 170 N/mm² to 220 N/mm², and
    the Knoop hardness is measured several times by a Knoop indenter under press load of 50 mN in accordance with a method of JIS Z 2215, the Knoop indenter is rotated by a given angle in each measurement, the each measurement is carried out at a same press position and a rotation axis of the Knoop indenter is orthogonal to an upper surface of the cellulose acylate film.

2. The cellulose acylate film according to claim 1, further comprising a compound represented by the following Formula (1) in an amount of 2% by mass to 20% by mass based on cellulose acylate:

B-(G-A)n-G-B            Formula (1)

wherein, each of B independently represents a benzenemonocarboxylic acid residue,
    each of G independently represents an alkylene glycol residue having 2 to 12 carbon atoms, an aryl glycol residue having 6 to 12 carbon atoms or an oxyalkylene glycol residue having 4 to 12 carbon atoms,
    A represents an alkylenedicarboxylic acid residue having 4 to 12 carbon atoms or an arylenedicarboxylic acid residue having 6 to 12 carbon atoms, and
    n represents an integer of 1 or more.

3. The cellulose acylate film according to claim 2, comprising two or more kinds of the compound represented by Formula (1).

4. The cellulose acylate film according to claim 1, further comprising a compound represented by the following Formula (I) in an amount of 2% by mass to 20% by mass based on cellulose acylate:

Formula (I)

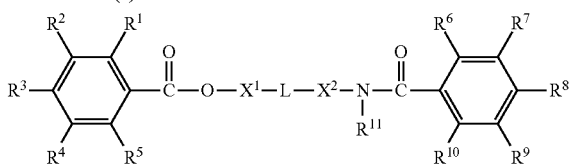

wherein, each of $R^1$ to $R^7$ and $R^9$ to $R^{11}$ independently represents a hydrogen atom or a substituent, $R^8$ represents a hydrogen atom or a non-conjugated substituent, each of $X^1$ and $X^2$ represents a single bond or an aliphatic linking group, L represents a single bond, —N($R^{12}$)— or —C($R^{13}$)($R^{14}$)—, and each of $R^{12}$ to $R^{14}$ independently represents a hydrogen atom or a substituent.

5. The cellulose acylate film according to claim 1, wherein the hindered amine-based compound is contained in an amount of 0.05% by mass to 2% by mass based on cellulose acylate.

6. The cellulose acylate film according to claim 1, wherein the hindered amine-based compound is represented by the following Formula (20):

Formula (20)

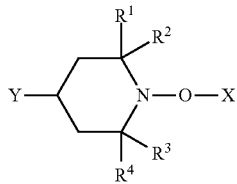

wherein, X represents an alkyl group or an aryl group which may be substituted,

Y represents a hydrogen atom or a substituent, and each of $R^1$ to $R^4$ independently represents an alkyl group.

7. The cellulose acylate film according to claim 1, wherein a difference (ΔHm-ΔHc) between a cold crystallization peak area (ΔHc) and a crystal melting peak area (ΔHm) is 10 J/g to 18 J/g when measured by differential scanning calorimetry (DSC).

8. The cellulose acylate film according to claim 1, wherein a degree of alignment in a thickness direction of the cellulose acylate film is 0.100 to 0.150.

9. A protective film for polarizing plate, comprising:

the cellulose acylate film according to claim 1; and an active energy ray-cured layer on the cellulose acylate film.

10. A polarizing plate, comprising:

a polarizer; and at least one protective film for polarizing plate, wherein the at least one protective film for polarizing plate is the protective film for polarizing plate according to claim 9, and the protective film for polarizing plate and the polarizer are bonded to each other such that the cellulose acylate film is nearer to the polarizer than the active energy ray-cured layer.

11. A liquid crystal display device comprising at least the polarizing plate according to claim 10.

12. A liquid crystal display device comprising at least the protective film for polarizing plate according to claim 9.

* * * * *